US010014986B2

(12) United States Patent
Berggren et al.

(10) Patent No.: US 10,014,986 B2
(45) Date of Patent: Jul. 3, 2018

(54) CARRIER AGGREGATION OF TDD AND FDD SUBFRAMES FOR UPLINK HARQ FEEDBACK

(71) Applicant: Huawei Technologies Co., Ltd., Shenzhen (CN)

(72) Inventors: Fredrik Berggren, Kista (SE); David Jean-Marie Mazzarese, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 15/206,010

(22) Filed: Jul. 8, 2016

(65) Prior Publication Data

US 2016/0323071 A1 Nov. 3, 2016

Related U.S. Application Data

(63) Continuation of application No. PCT/EP2014/050310, filed on Jan. 9, 2014.

(51) Int. Cl.
*H04L 1/18* (2006.01)
*H04L 5/00* (2006.01)
(Continued)

(52) U.S. Cl.
CPC ............ *H04L 1/1861* (2013.01); *H04L 5/001* (2013.01); *H04L 5/0055* (2013.01); *H04L 5/14* (2013.01);
(Continued)

(58) Field of Classification Search
CPC ... H04L 1/1861; H04L 1/0023; H04L 1/0027; H04L 1/18; H04L 1/1825; H04L 1/0073;
(Continued)

(56) References Cited

U.S. PATENT DOCUMENTS 9,432,147 B2 * 8/2016 Park ...................... H04L 1/1812
9,882,681 B2 * 1/2018 Sun ....................... H04L 1/1854
(Continued)

FOREIGN PATENT DOCUMENTS

EP 2557878 A1 2/2013
JP 2015525546 A 9/2015
WO WO 2013192601 A2 12/2013

OTHER PUBLICATIONS

"HARQ operation for TDD-FDD CA with TDD Pcell," 3GPP TSG RAN WG1 #75, San Francisco, USA, R1-135201, 3rd Generation Partnership Project, Valbonne, France (Nov. 11-15, 2013).
(Continued)

*Primary Examiner* — Warner Wong
(74) *Attorney, Agent, or Firm* — Leydig, Voit & Mayer, Ltd.

(57) ABSTRACT

Method comprises determining a first HARQ timing wherein an association determines which UL subframes in the TDD carrier that are defined for transmitting HARQ on an UL control channel for an associated set of DL subframes in the FDD carrier, determining a second HARQ timing, wherein an association determines which UL subframes that are defined for transmitting HARQ on an UL shared channel for an associated set of DL subframes in the FDD carrier, resulting in a first set of UL subframes for which the physical UL shared channel is enabled to comprise HARQ, and a second set of UL subframes is not comprising HARQ, and assigning UL channel resources for the HARQ feedback on the physical UL shared channel in said first set of UL subframes, according to said second DL HARQ timing, when there is no UL control channel assigned according to said first DL HARQ timing.

15 Claims, 8 Drawing Sheets

(51) Int. Cl.
   *H04L 5/14* (2006.01)
   *H04W 72/04* (2009.01)
   *H04W 72/12* (2009.01)
   *H04L 1/00* (2006.01)
(52) U.S. Cl.
   CPC ......... *H04L 5/1469* (2013.01); *H04W 72/042* (2013.01); *H04W 72/0413* (2013.01); *H04W 72/1284* (2013.01); *H04L 1/0079* (2013.01); *H04L 1/18* (2013.01)
(58) Field of Classification Search
   CPC ....... H04L 1/0079; H04L 5/14; H04L 5/0055; H04L 1/1896; H04L 5/0073; H04W 72/1284; H04W 72/0413; H04W 72/042; H04W 72/0406; H04W 72/005; H04W 72/02; H04W 72/04; H04W 72/00; H04W 74/00; H04W 74/002
   See application file for complete search history.

(56) References Cited

U.S. PATENT DOCUMENTS

| | | | |
|---|---|---|---|
| 2013/0028149 A1 | 1/2013 | Chen et al. | |
| 2013/0028205 A1 | 1/2013 | Damnjanovic et al. | |
| 2013/0194981 A1* | 8/2013 | Wang | H04L 1/1671 370/280 |
| 2013/0242814 A1* | 9/2013 | Wang | H04L 1/1861 370/280 |
| 2013/0242815 A1* | 9/2013 | Wang | H04L 1/1854 370/280 |
| 2013/0242881 A1* | 9/2013 | Wang | H04L 1/18 370/329 |
| 2013/0343239 A1 | 12/2013 | Damnjanovic et al. | |
| 2014/0086112 A1* | 3/2014 | Stern-Berkowitz | H04W 72/1289 370/280 |
| 2014/0092824 A1* | 4/2014 | He | H04W 52/0258 370/329 |
| 2015/0117275 A1* | 4/2015 | Park | H04L 1/1812 370/280 |
| 2016/0204924 A1* | 7/2016 | Li | H04L 1/1896 370/280 |
| 2016/0316457 A1* | 10/2016 | Lan | H04L 1/1861 |
| 2016/0374082 A1* | 12/2016 | Nguyen | H04W 72/044 |
| 2017/0149537 A1* | 5/2017 | Seo | H04L 1/1861 |
| 2017/0331611 A1* | 11/2017 | Stern-Berkowitz | H04L 1/1854 |

OTHER PUBLICATIONS

"Remaining details for TDD-FDD CA," 3GPP TSG RAN WG1 Meeting #76, Prague, Czech Republic, R1-140031, 3rd Generation Partnership Project, Valbonne, France (Feb. 10-14, 2014).

"PDSCH timing with TDD as PCell for FDD-TDD CA," 3GPP TSG RAN WG1 Meeting #75, San Francisco, USA, R1-135072, 3rd Generation Partnership Project, Valbonne, France (Nov. 11-15, 2013).

"3rd Generation Partnership Project;Technical Specification Group Radio Access Network;Evolved Universal Terrestrial Radio Access (E-UTRA);Physical layer procedures(Release 12)," 3GPP TS 36.213 V12.0.0, 3rd Generation Partnership Project, Valbonne, France (Dec. 2013).

JP 2016-545936, Notice of Reasons for Rejection, dated Dec. 12, 2017.

KR 10-2016-7021344, Office Action, dated Dec. 11, 2017.

* cited by examiner

CARRIER AGGREGATION OF TDD AND FDD SUBFRAMES FOR UPLINK HARQ FEEDBACK

CROSS-REFERENCE TO RELATED APPLICATIONS

This application is a continuation of International Application No. PCT/EP2014/050310, filed on Jan. 9, 2014, which is hereby incorporated by reference in its entirety.

TECHNICAL FIELD

Implementations described herein generally relate to a first communication device, a method in a first communication device, a second communication device and a method in a second communication device. In particular is herein described a mechanism for enabling HARQ feedback for data provided by aggregation of an FDD carrier and a TDD carrier.

BACKGROUND

The prior art LTE-Advanced system supports carrier aggregation, where the communication between a radio network node/base station/eNodeB, and the User Equipment (UE) is facilitated by means of concurrent usage of multiple component carriers (or serving cells) in the downlink (DL) and/or uplink (UL). In the present context, the expressions downlink (DL), downstream link or forward link may be used for the transmission path from the radio network node to the UE. The expression uplink (UL), upstream link or reverse link may be used for the transmission path in the opposite direction, i.e., from the UE to the radio network node.

Furthermore, in order to divide forward and reverse communication channels on the same physical communications medium, when communicating in a wireless communication system, a duplexing method may be applied such as, e.g., Frequency-Division Duplexing (FDD) and/or Time-Division Duplexing (TDD). The FDD approach is used over well separated frequency bands in order to avoid interference between uplink and downlink transmissions. In TDD, uplink and downlink traffic are transmitted in the same frequency band, but in different time intervals. The uplink and downlink traffic is thus transmitted separated from each other, in the time dimension in a TDD transmission, possibly with a Guard Period (GP) in between uplink and downlink transmissions. In order to avoid interference between uplink and downlink, for radio network nodes and/or UEs in the same area, uplink and downlink transmissions between radio network nodes and UEs in different cells may be aligned by means of synchronisation to a common time reference and use of the same allocation of resources to uplink and downlink.

Component carriers may be located contiguously or discontiguously within a frequency band or could even be located in different frequency bands. Hence, carrier aggregation improves the spectrum utilisation for the network operator and allows higher data rates to be provided. Although carrier aggregation is defined both for FDD and TDD, UEs in the prior art system do not operate on FDD and TDD carriers simultaneously, hence there is no carrier aggregation utilising carriers with different duplexing methods. Since network operators may be in possession of both FDD and TDD carriers, it is however desirable to extend the principle to carrier aggregation of FDD and TDD carriers.

One major issue for carrier aggregation concerns the UL feedback. For DL carrier aggregation, the UE will transmit HARQ feedback, including ACK and NACK messages corresponding to the received transport blocks, which are transmitted in the Physical Downlink Shared Channel (PDSCH). In the prior art LTE-Advanced system, the HARQ feedback is transmitted either in the Physical UL Control Channel (PUCCH) on the primary cell (PCell) or in a Physical UL Shared Channel (PUSCH), which may be scheduled on any serving cell. The PUSCH may be scheduled by means of UL grants transmitted in a downlink (DL) control channel, e.g., the Physical Downlink Control Channel (PDCCH) or an Enhanced PDCCH (EPDCCH). If a PUSCH transmission has been scheduled but the UE is not capable of simultaneously transmitting the PUCCH and the PUSCH, the PUCCH will not be transmitted and the HARQ feedback will be multiplexed into the PUSCH, possibly with user data.

Data transmissions may be arranged in subframes (e.g., of 1 ms length) and a set of subframes may constitute a radio frame (e.g., of 10 ms length). For a TDD radio frame, the number of DL subframes may be larger than the number of UL subframes. Hence, an UL subframe may be used for transmitting HARQ information corresponding to multiple DL subframes. Therefore, with FDD and TDD carrier aggregation, if a TDD carrier is configured as the PCell, multiple DL subframes in the FDD carrier may be associated with one UL subframe in the TDD carrier, designated to carry the HARQ feedback for the FDD carrier and the TDD carrier.

FIG. 1 shows one example where a TDD component carrier is configured as a PCell and where a secondary cell (SCell) comprises one DL FDD component carrier and one UL FDD component carrier. Thus FIG. 1 illustrates the SCell DL HARQ timing, i.e., the timing relation between DL subframes of the SCell to an UL subframe in the PCell. For example, subframe 2 in the TDD carrier may be used to transmit HARQ feedback for subframe 1, 2, 5 and 6 of the FDD carrier. Additionally, subframe 2 in the TDD carrier may be used to transmit HARQ feedback for some subframes of the TDD carrier. Furthermore, the SCell UL scheduling timing is also shown for some of the UL subframes in the SCell, i.e., the timing relation between an UL grant transmitted in a DL control channel on the SCell and the scheduled PUSCH on the SCell.

If a PUSCH is scheduled on the PCell, HARQ feedback from the PCell and/or the SCell can be transmitted in this PUSCH. On the other hand, if a PUSCH for HARQ feedback is only scheduled on the SCell (i.e., an FDD carrier), HARQ feedback from the PCell and/or the SCell can be multiplexed into the PUSCH of the FDD carrier. However, for the FDD UL carrier, there exist more UL subframes compared to a TDD carrier and thus more opportunities for scheduling a PUSCH. At the same time, it is crucial that both the UE and the eNodeB unambiguously know how and when the HARQ feedback is carried in a PUSCH. Otherwise, the eNodeB may lose HARQ information, which will decrease the spectral efficiency of the system due to causing more retransmissions as well as introducing more signalling from the UE.

Moreover, the amount of HARQ feedback depends on how many DL subframes that contained actual transmissions. In order to determine suitable number of time-frequency resources to be used for the HARQ feedback in the PUSCH, a DL Assignment Index (DAI) can be signalled in the UL grant. The DAI may represent the total number of subframes that contained DL transmissions in the associated set of DL subframes. Also here it is crucial that both the UE and the eNodeB unambiguously know how to utilise the DAI values in order to use as few time-frequency resources as possible for the HARQ feedback, i.e., to maximize the spectral efficiency of the system.

In LTE-Advanced, carrier aggregation is performed by receiving/transmitting on a set of serving cells, wherein a serving cell comprises at least a DL component carrier and possibly an UL component carrier. A UE is always configured with a primary serving cell (PCell) and additionally also with secondary serving cells (SCells). Here, the notion of cell may not refer to a geometrical area, rather it may be regarded as logical concept. A UE is always configured with a primary serving cell (PCell) and additionally also with secondary serving cells (SCells). The PUCCH is always transmitted on the PCell.

HARQ feedback is sent in the UL (in the PUCCH or the PUSCH) in response to a PDSCH scheduled by PDCCH/EPDCCH, a Semi-Persistently Scheduled (SPS) PDSCH or a PDCCH/EPDCCH indicating SPS release. Three HARQ feedback states are used; ACK, NACK and DTX. A successful decoding attempt results in an ACK while a NACK is sent if the decoding attempt was non-successful. DTX refers to discontinuous transmission, which occurs if the UE did not receive any PDSCH, e.g., if it missed receiving a transmitted PDCCH/EPDCCH, or if there was no transmitted PDCCH/EPDCCH or PDSCH. Sometimes NACK is merged with DTX to a joint state NACK/DTX. In case of a joint NACK/DTX state, the eNodeB cannot discriminate between the NACK and DTX and would, if there was a scheduled PDSCH, need to perform a complete retransmission. This precludes using incremental redundancy for the retransmission since the eNodeB does not know whether the UE made a non-successful decoding attempt or not.

For TDD, a component carrier is configured with 1 out of 7 UL-DL configurations, defining the transmission direction of the subframes in the radio frame. A radio frame comprises DL subframes, UL subframes and special (S) subframes. The special subframes contain one part for DL transmission, a guard period and one part for UL transmission. The number of DL subframes, M, (sometimes also referred to as a bundling window) which are associated with an UL subframe for transmitting HARQ feedback is dependent on the TDD UL-DL configuration as well as the index of the specific UL subframe. In practice, the same UL-DL configuration has to be used in neighbouring cells in order to avoid UE-to-UE and eNodeB-to-eNodeB interference. However, LTE-Advanced also allows the possibility to dynamically change the UL/DL configuration. Such UEs may follow a different HARQ timing (e.g., that of another reference TDD UL-DL configuration) than that of the actually used UL-DL configuration for the transmissions.

The PDCCH/EPDCCH comprise the DL Control Information (DCI) related to the PDSCH transmission (i.e., a DL assignment) or the PUSCH transmission (i.e., an UL grant). For TDD, the DCI comprises DAI of 2 bits. When the DCI comprises a DL assignment, the DAI works as an incremental counter on a subframe basis for the number of PDCCHs/EPDCCHs/PDSCHs that were transmitted during the set of M DL subframes. With the DAI information, the UE may be able to detect whether it has missed receiving any PDCCH/EPDCCH, except for the last subframe of the set of M DL subframes. When the DCI comprises an UL grant, the DAI works as an indication of the total number of PDCCHs/EPDCCHs/PDSCHs that were transmitted during the associated set of M DL subframes and this information is utilised in order to detect whether the UE missed any transmissions and to determine the number of time-frequency resources to be used for HARQ feedback in the PUSCH. In the case of carrier aggregation, the UL DAI may represent the maximum number of subframes that were transmitted during the set of M DL subframes for all component carriers.

For FDD, the UL scheduling timing is such that an UL grant transmitted in subframe n schedules the PUSCH in subframe n+4. Moreover, a PDSCH scheduled by PDCCH/EPDCCH, a Semi-Persistently Scheduled (SPS) PDSCH or a PDCCH/EPDCCH indicating SPS release transmitted in subframe n would imply that its associated HARQ feedback is transmitted in the UL in subframe n+4. Due to the processing time in the eNodeB, a PDSCH from the same HARQ process could be retransmitted earliest in subframe n+8. The round trip time delay is thus 8 subframes, which implies that 8 HARQ processes can be used. The DL HARQ protocol is asynchronous in the DL and the HARQ process number is explicitly signalled in the DCI.

Furthermore for FDD, HARQ feedback on the PUSCH can be transmitted in any UL subframe subject to that a DL transmission in subframe n would imply that it's associated HARQ feedback is transmitted on the PUSCH in subframe n+4. The UL grant would therefore have to be transmitted in subframe n. In the prior art FDD carrier aggregation, DL subframes are associated in a one-to-one fashion to UL subframes for HARQ feedback on PUSCH and there is no bundling window (i.e., no many-to-one subframe association).

For the case where the PCell is TDD and there is at least one SCell which is FDD, it may be possible to transmit the HARQ information on PUSCH on an FDD SCell. However, it is a problem to determine which UL subframes that should contain HARQ feedback on PUSCH. It is a further problem how to arrange the DAI in the UL grants for the PUSCH.

SUMMARY

It is therefore an object to obviate at least some of the above mentioned disadvantages and to improve the performance in a communication system.

This and other objects are achieved by the features of the appended independent claims. Further implementation forms are apparent from the dependent claims, the description and the figures.

According to a first aspect, a method is provided in a first communication device, for assignment of UL channel resources by determining a first DL HARQ timing for an FDD carrier and a second DL HARQ timing for the FDD carrier, for enabling a second communication device to provide HARQ feedback on a physical UL shared channel in a communication system based on TDD and FDD carrier aggregation of at least one TDD carrier and at least one FDD carrier. The method comprises determining the first DL HARQ timing for the FDD carrier, wherein an association determines which UL subframes in the TDD carrier that are defined for transmitting HARQ feedback on an UL control channel for an associated set of DL subframes in the FDD carrier. Also, the method comprises determining the second DL HARQ timing for the FDD carrier, wherein an association determines which UL subframes in the FDD carrier that are defined for transmitting HARQ feedback on an UL shared channel for an associated set of DL subframes in the FDD carrier, whereby said determination results in a first set of UL subframes for which the physical UL shared channel is enabled to comprise HARQ feedback, and a second set of UL subframes for which the physical UL shared channel is not comprising HARQ feedback. Also, the method comprises assigning UL channel resources for the HARQ feedback on the physical UL shared channel in said first set of UL subframes, according to said second DL HARQ timing, when there is no UL control channel assigned according to said first DL HARQ timing.

In a first possible implementation of the method according to the first aspect, the assignment of UL shared channel resources comprises scheduling of the physical UL shared channel by the first communication device.

In a second possible implementation of the method according to the first aspect, or the previous possible implementation of the method according to the first aspect, the determined second DL HARQ timing is used to determine which UL subframes in the TDD carrier that are defined for transmitting HARQ feedback on a physical UL shared channel for an associated set of DL subframes in the FDD carrier.

In a third possible implementation of the method according to the first aspect, or any previous possible implementation of the method according to the first aspect, the first DL HARQ timing is identical with the second DL HARQ timing.

In a fourth possible implementation of the method according to the first aspect, or any previous possible implementation of the method according to the first aspect, the first DL HARQ timing comprises a timing defined by 3rd Generation Partnership Project (3GPP) Long Term Evolution (LTE) release 8, 9, 10 and/or 11.

In a fifth possible implementation of the method according to the first aspect, or any previous possible implementation of the method according to the first aspect, for each UL subframe k in the TDD carrier, a set $M_k$ represents associated DL subframes on the FDD carrier, and wherein the second DL HARQ feedback timing for HARQ feedback on the physical UL channel is defined such that HARQ feedback is enabled on the physical UL shared channel in the FDD carrier, for a given set $M_k$ on the FDD carrier from subframe n=max $M_k$+$\Delta$ to subframe n=k where $\Delta$ is an offset value.

In a sixth possible implementation of the method according to the first aspect, or any previous possible implementation of the method according to the first aspect, the offset value $\Delta$ is set to at least 4, i.e., $\Delta \geq 4$.

In a seventh possible implementation of the method according to the first aspect, or any previous possible implementation of the method according to the first aspect, one single UL subframe, defined to transmit HARQ feedback on the physical UL shared channel, is associated with a set $M_k$.

In an eighth possible implementation of the method according to the first aspect, or any previous possible implementation of the method according to the first aspect, multiple UL subframes, defined to transmit HARQ feedback on the physical UL shared channel, are associated with a set $M_k$.

In a ninth possible implementation of the method according to the first aspect, or any previous possible implementation of the method according to the first aspect, the first DL HARQ timing is determined such that at most N−1 of N consecutive DL subframes in the FDD carrier are associated with one or more UL subframes in a TDD carrier, and wherein the method further comprises only enabling HARQ feedback transmission for the non-associated subframe/s on the physical UL shared channel.

In a tenth possible implementation of the method according to the first aspect, or any previous possible implementation of the method according to the first aspect, a separate DL HARQ timing is determined for HARQ feedback on the physical UL shared channel for subframes which do not have an association according to the determined first DL HARQ timing for the UL control channel transmission.

In an eleventh possible implementation of the method according to the first aspect, or any previous possible implementation of the method according to the first aspect, the same DL HARQ timing is determined for HARQ feedback on the physical UL shared channel for subframes which do not have an association according to the determined first DL HARQ timing for the UL control channel transmission, as for the associated subframes.

In a twelfth possible implementation of the method according to the first aspect, or any previous possible implementation of the method according to the first aspect, a Downlink Assignment Index (DAI) field is present in UL grants for all subframes in the radio frame, i.e., both the first and the second UL subframe set.

In a thirteenth possible implementation of the method according to the first aspect, or any previous possible implementation of the method according to the first aspect, the DAI field in the second set in UL grants is not used for containing any DAI, but is kept for reserved purpose.

In a fourteenth possible implementation of the method according to the first aspect, or any previous possible implementation of the method according to the first aspect, the bits in the DAI field in UL grants are set to predefined values.

In a fifteenth possible implementation of the method according to the first aspect, or any previous possible implementation of the method according to the first aspect, in a subframe, where the second communication device is scheduled both a DL assignment and an UL grant in the FDD carrier, the value of the DAI in the UL grant is set to be the same as the DAI value in the DL assignment.

In a sixteenth possible implementation of the method according to the first aspect, or any previous possible implementation of the method according to the first aspect, further comprising providing the determined first DL HARQ timing and the determined second DL HARQ timing to the second communication device.

In a seventeenth possible implementation of the method according to the first aspect, or any previous possible implementation of the method according to the first aspect, the first communication device comprises an enhanced NodeB in a LTE system. The second communication device comprises a User Equipment (UE); the DL subframe comprises a Physical Downlink Shared Channel (PDSCH) in the DL FDD carrier. The DL subframe comprises a Physical Downlink Shared Channel (PDSCH) in the TDD carrier. The UL control channel subframe comprises a Physical Uplink Control Channel (PUCCH) in the UL TDD carrier. The physical UL shared channel comprises a Physical Uplink Shared Channel (PUSCH) in the TDD carrier and/or in the FDD carrier.

In a second aspect, a first communication device is provided for assignment of UL channel resources by determining a first DL HARQ timing for an FDD carrier and a second DL HARQ timing for the FDD carrier, for enabling a second communication device to provide HARQ feedback on a physical UL shared channel, in a communication system based on TDD and FDD carrier aggregation of at least one TDD carrier and at least one FDD carrier. The first communication device comprises: a processor, configured for determining the first DL HARQ timing for the FDD carrier, wherein an association determines which UL subframes in the TDD carrier that are defined for transmitting HARQ feedback on an UL control channel for an associated set of DL subframes in the FDD carrier, and also configured for determining the second DL HARQ timing for the FDD carrier, wherein an association determines which UL subframes in the FDD carrier that are defined for transmitting HARQ feedback on an UL shared channel for an associated set of DL subframes in the FDD carrier, whereby said determination results in a first set of UL subframes for which the physical UL shared channel is enabled to comprise HARQ feedback, and a second set of UL subframes for which the physical UL shared channel is not comprising HARQ feedback, and further configured for assigning UL channel resources for the HARQ feedback on the physical UL shared channel in said first set of UL subframes, according to said second DL HARQ timing, when there is no UL control channel assigned according to said first DL HARQ timing.

In a first possible implementation of the second aspect, the first communication device further comprises a transmitter, configured for transmitting data on said DL FDD carrier and/or TDD carrier, to be received by the second communication device, and a receiver, configured for receiving HARQ feedback from the second communication device, related to the transmitted data.

In a second possible implementation of the second aspect, the processor is further configured for implementing the method according to the first aspect, or any possible implementation of the first aspect.

According to a third aspect, a computer program is provided, comprising program code for performing a method according to the first aspect, or any implementation of the first aspect, in a first communication device, for assignment of UL channel resources by determining a first DL HARQ timing for a FDD carrier and a second DL HARQ timing for the FDD carrier, for enabling a second communication device to provide HARQ feedback on a physical UL shared channel in a communication system based on TDD and FDD carrier aggregation of at least one TDD carrier and at least one FDD carrier.

According to a fourth aspect, a computer program product is provided, comprising a computer readable storage medium storing program code thereon for assignment of UL channel resources by determining a first DL HARQ timing for an FDD carrier and a second DL HARQ timing for the FDD carrier, for enabling a second communication device to provide HARQ feedback on a physical UL shared channel in a communication system based on TDD and FDD carrier aggregation of at least one TDD carrier and at least one FDD carrier, wherein the program code comprises instructions for executing a method, comprising: determining the first DL HARQ timing for the FDD carrier, wherein an association determines which UL subframes in the TDD carrier that are defined for transmitting HARQ feedback on an UL control channel for an associated set of DL subframes in the FDD carrier, and determining the second DL HARQ timing for the FDD carrier, wherein an association determines which UL subframes in the FDD carrier that are defined for transmitting HARQ feedback on a physical UL shared channel for an associated set of DL subframes in the FDD carrier, whereby said determination results in a first set of UL subframes for which the physical UL shared channel is enabled to comprise HARQ feedback, and a second set of UL subframes for which the physical UL shared channel is not comprising HARQ feedback, and also assigning UL channel resources for the HARQ feedback on the physical UL shared channel in said first set of UL subframes, according to said second DL HARQ timing, when there is no UL control channel assigned according to said first DL HARQ timing.

According to a fifth aspect, a method in a second communication device is disclosed, for providing HARQ feedback on a physical UL shared channel, in a communication system based on TDD and FDD carrier aggregation of at least one TDD carrier and at least one FDD carrier, according to an assignment made by a first communication device, wherein the method comprises: transmitting HARQ feedback on the physical UL shared channel for DL subframes which have been associated with a subframe according to a DL HARQ timing determined by the first communication device.

In a first possible implementation of the fifth aspect, the method further comprises obtaining the first DL HARQ timing and the second DL HARQ timing, determined by the first communication device.

According to a sixth aspect, a second communication device is disclosed for providing HARQ feedback on a physical UL shared channel, in a communication system based on TDD and FDD carrier aggregation of at least one TDD carrier and at least one FDD carrier, according to an assignment made by a first communication device, wherein the second communication device comprises: a transmitter, configured for transmitting HARQ feedback on the physical UL shared channel for DL subframes which have been associated with a subframe according to a DL HARQ timing determined by the first communication device.

In a first possible implementation of the sixth aspect, the second communication device further comprises a processor, configured for obtaining the first DL HARQ timing and the second DL HARQ timing, determined by the first communication device.

In a seventh aspect, a computer program is provided, comprising program code for performing a method according to the fifth aspect, or any possible implementation of the fifth aspect in a second communication device, for providing HARQ feedback on a physical UL shared channel, in a communication system based on TDD and FDD carrier aggregation of at least one TDD carrier and at least one FDD carrier, according to an assignment made by a first communication device.

In an eighth aspect, a computer program product is provided comprising a computer readable storage medium storing program code thereon for providing HARQ feedback on a physical UL shared channel, in a communication system based on TDD and FDD carrier aggregation of at least one TDD carrier and at least one FDD carrier, according to an assignment made by a first communication device, wherein the program code comprises instructions for executing the method, comprising: transmitting HARQ feedback on the physical UL shared channel for DL subframes which have been associated with a subframe according to a DL HARQ timing determined by the first communication device.

Thanks to the herein described aspects, it is possible to provide HARQ feedback for data transmitted by carrier aggregation of signals transmitted on at least one FDD carrier and at least one TDD carrier, such that both the transmitting part and the receiving part knows unambiguously when HARQ feedback is provided on a physical UL shared channel. Further, in some aspects herein described, DAI fields may be used for other purpose than counting transmitted/received subframes in some embodiments. Thus an improved performance within a wireless communication system is provided.

Other objects, advantages and novel features of the aspects of the invention will become apparent from the following detailed description.

BRIEF DESCRIPTION OF THE DRAWINGS

Various embodiments are described in more detail with reference to the attached drawings in which.

DETAILED DESCRIPTION

Embodiments of the invention described herein are defined as a first communication device and a method in a first communication device, a second communication device and a method in the second communication device which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 2:
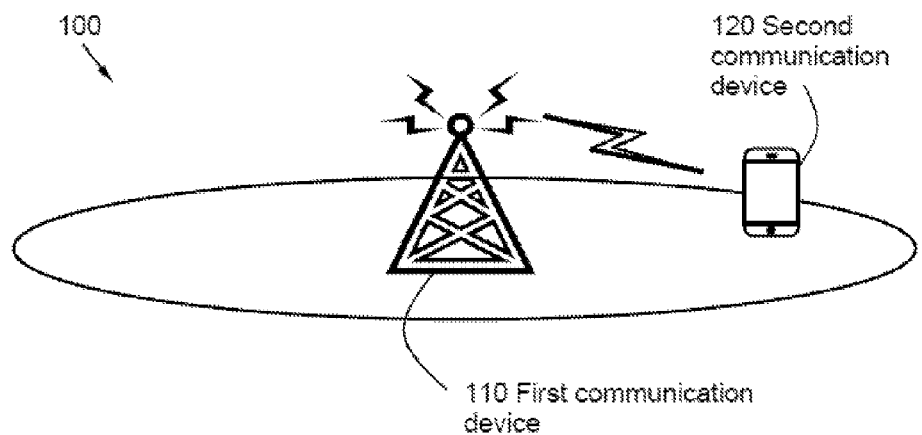
FIG. 2 is a block diagram illustrating a communication system according to some embodiments.

FIG. 2 is a schematic illustration over a communication system 100 comprising a first communication device 110 communicating with a second communication device 120, which is served by the first communication device 110.

The communication system 100 may at least partly be based on radio access technologies such as, e.g., 3rd Generation Partnership Project (3GPP) Long Term Evolution (LTE), LTE-Advanced, 4th Generation (4G) LTE, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (Wi-Max), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1xRTT and High Rate Packet Data (HRPD), just to mention some few options. The expressions "communication system", "wireless communication network", "wireless communication system" and/or "cellular telecommunication system" may within the technological context of this disclosure sometimes be utilised interchangeably.

The communication system 100 may be configured for carrier aggregation of at least one Frequency Division Duplex (FDD) carrier and at least one Time Division Duplex (TDD) carrier, according to different embodiments, in the downlink and optionally in the uplink.

The purpose of the illustration in FIG. 2 is to provide a simplified, general overview of the communication system 100 and the involved methods and communication devices 110, 120, such as the first communication device 110 and the second communication device 120 herein described, and the functionalities involved. The method and communication system 100 will subsequently, as a non-limiting example, be described in a 3GPP LTE/LTE-Advanced environment, but the embodiments of the disclosed methods and communication system 100 may be based on another access technology such as, e.g., any of the above already enumerated. Thus, although embodiments of the invention may be described based on, and using the lingo of, 3GPP LTE systems, it is by no means limited to 3GPP LTE.

The illustrated communication system 100 thus comprises the first communication device 110, which may send radio signals to be received by the second communication device 120.

It is to be noted that the illustrated network setting of one entity of the first communication device 110 and one entity of the second communication device 120 in FIG. 2 is to be regarded as a non-limiting example of an embodiment only. The communication system 100 may comprise any other number and/or combination of communication devices 110, 120. A plurality of second communication devices 120 and another configuration of the first communication device 110 may thus be involved in some embodiments.

Thus whenever "one" or "a/an" first communication device 110 and/or second communication device 120 is referred to in the present context, a plurality of first communication devices 110 and/or second communication devices 120 may be involved, according to some embodiments.

The first communication device 110 may according to some embodiments be configured for DL transmission and may be referred to, respectively, as e.g., a base station, NodeB, evolved Node Bs (eNB, or eNodeB), base transceiver station, Access Point Base Station, base station router, Radio Base Station (RBS), micro base station, pico base station, femto base station, Home eNodeB, sensor, beacon device, relay node, repeater or any other network node configured for communication with the second communication device 120 over a wireless interface, depending, e.g., of the radio access technology and/or terminology used.

The second communication device 120 may correspondingly be represented by, e.g., a User Equipment (UE), a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the first communication device 110, according to different embodiments and different vocabulary.

However, for some embodiments, the situation may be the reversed, such that the first communication device 110 may be configured for UL transmission and may be referred to, respectively, as e.g., User Equipment (UE), a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the second communication device 120, according to different embodiments and different vocabulary.

Thus correspondingly, the second communication device 120 may be represented by e.g., a base station, NodeB, evolved Node Bs (eNB, or eNodeB), base transceiver station, Access Point Base Station, base station router, Radio Base Station (RBS), micro base station, pico base station, femto base station, Home eNodeB, sensor, beacon device, relay node, repeater or any other network node configured for communication with the first communication device 110 over a wireless interface, depending, e.g., of the radio access technology and/or terminology used.

Some embodiments defines a method for TDD and FDD carrier aggregation, for transmitting HARQ feedback on a physical UL shared channel in an FDD carrier, in the communication system 100. At least one TDD carrier and at least one FDD carrier are used for the carrier aggregation.

A DL HARQ timing is used for the FDD carrier(s) where an association determines which UL subframes in the TDD carrier that are defined for transmitting HARQ feedback on a physical UL control channel for an associated set of DL subframes in the FDD carrier. In one embodiment, the DL HARQ timing for the FDD carrier is such that at least N−1 of N consecutive DL subframes in an FDD carrier are associated with one or more UL subframes in a TDD carrier.

Furthermore, each TDD carrier is using a DL HARQ timing, where an association determines which UL subframes in the TDD carrier that are defined for transmitting HARQ feedback on a physical UL control channel for an associated set of DL subframes in the TDD carrier.

Thereby, as a result from the made DL HARQ timing of the FDD carrier for the physical UL shared channel, two sets of UL subframes in the FDD carrier emerge: a first set of UL subframes for which a physical UL shared channel may contain HARQ feedback, i.e., is enabled to contain HARQ feedback when there is feedback to be transmitted and a second set of UL subframes for which a physical UL shared channel may not contain HARQ feedback, i.e. is disabled from comprising feedback and thus never contains any feedback.

The HARQ feedback timing for the HARQ feedback on the physical UL shared channel may be defined such that HARQ feedback can be transmitted on the physical UL shared channel for a given bundling window $M_k$ from subframe n=max $M_k$+Δ to subframe n=k.

UL subframes for HARQ feedback may be determined differently in different embodiments. In one embodiment of the invention, one single UL subframe, defined to transmit HARQ feedback on a physical UL shared channel, may be associated with a bundling window. In another embodiment of the invention, multiple UL subframes, defined to transmit HARQ feedback on a physical UL shared channel, may be associated with the bundling window.

For the case where the DL HARQ timing is such that at most N−1 of N consecutive DL subframes in an FDD carrier are associated with one or more UL subframes in a TDD carrier, the method further comprises to transmit HARQ feedback for the non-associated subframe on the physical UL shared channel only. It is disclosed to perform this according to either of the following embodiments:

i) A separate DL HARQ timing may be determined for HARQ feedback on the physical UL shared channel for subframes which do not have an association according to the DL HARQ timing for physical UL control channel transmission.

ii) The same DL HARQ timing may be determined for HARQ feedback on the physical UL shared channel for subframes which do not have an association according to the DL HARQ timing for physical UL control channel transmission, as for the other subframes.

Furthermore, according to some embodiments, values of DAI in UL grants may be determined. In some embodiments, a DAI field may be present in UL grants for all subframes in the radio frame, i.e., both the first and the second UL subframe set.

In one embodiment, the DAI field in UL grants may be reserved for a dedicated purpose and is not used for containing any DAI. In one embodiment, the bits in the DAI field in UL grants may be set to predefined values.

In one embodiment, in a subframe, where the first communication device 110 has scheduled both a DL assignment and an UL grant in the FDD carrier, the value of the DAI in the UL grant may be set to be the same as the DAI value in the DL assignment of the TDD carrier.

Thereby, transmission of HARQ feedback on the physical UL shared channel is enabled.

Some embodiments of the method comprise transmitting HARQ feedback from the TDD carrier(s) and/or from the FDD carrier(s) in the physical UL shared channel on an FDD carrier.

HARQ feedback for the TDD carrier(s), if any, may be transmitted in the physical UL shared channel for DL subframes associated with the given subframe according to the TDD DL HARQ timing for physical UL control channel transmission. HARQ feedback for the FDD carrier(s), if any, may be transmitted in the physical UL shared channel for DL subframes associated with the given subframe according to the DL HARQ timing of previously described embodiments.

Without loss of generality, consider a radio frame comprising N subframes indexed as n=0, . . . , N−1. A skilled reader will realise that subframe n+p, where p is a positive integer, may be located in a later radio frame and may have index (n+p) modulo N in that radio frame. Suppose the system 100 comprises one TDD carrier which is designated to accommodate the physical UL control channel for the second communication device 120 and one FDD carrier. The system 100 may in some embodiments be extended with additional TDD carriers and/or FDD carriers.

As a characterising feature, the method comprises the use of DL HARQ timing for the FDD DL carrier associating up to N DL subframes with one or more UL subframes in the TDD carrier. In particular, said association determines which UL subframes in the TDD carrier that are defined for transmitting HARQ feedback on the physical UL control channel (e.g., the PUCCH) for the associated DL subframes in the FDD carrier. As an example, in FIG. 1, 10 out of 10

DL subframes in the FDD carrier are associated with 3 UL subframes in a TDD carrier, i.e., DL subframes 1, ..., 9 in radio frame k and DL subframe 0 in radio frame k+1, are associated with UL subframes 2, 3 and 4 in radio frame k+1 in the TDD carrier.

An example of said DL HARQ timing determining which UL subframes in the TDD carrier that are defined for transmitting HARQ feedback on the physical UL control channel (e.g., the PUCCH), for the associated DL subframes in the FDD carrier, is to apply an existing DL HARQ timing of the system. For example, a second communication device 120, or UE, being capable of TDD and FDD carrier aggregation would also be capable of operating only on the TDD carrier and it would thus also have to implement HARQ feedback procedures for a single TDD carrier. To reduce the implementation complexity and the cost of the UE, a DL HARQ timing for the TDD carrier could be applied also for the TDD and FDD carrier aggregation case. In one example, the timing could be from the 3GPP LTE Release 8/9/10/11 system.

Sometimes, the second communication device 120 may be scheduled to transmit a physical UL shared channel while it is also expected to provide HARQ feedback. Sometimes, the second communication device 120 may not be capable of simultaneously transmitting the physical UL control channel and the physical UL shared channel. The HARQ feedback may then be carried by the physical UL shared channel. In the following, embodiments will be described, comprising arrangement of HARQ feedback transmission on a physical UL shared channel. For notational convenience, the physical UL control channel may be referred to as PUCCH and the physical UL shared channel may be referred to as PUSCH, without necessarily limiting the disclosed embodiments to implementation within a 3GPP LTE environment.

The method further comprises to determine a second DL HARQ timing with an association determining which UL subframes in the FDD carrier that are defined for transmitting HARQ feedback on an UL shared channel for an associated set of DL subframes in the FDD carrier. A particular feature of the method is that, with this DL HARQ timing, two sets of UL subframes in the FDD carrier are resulting; the first set of UL subframes for which a physical UL shared channel may contain HARQ feedback and the second set of UL subframes for which a physical UL shared channel may not contain HARQ feedback. This is in contrast to the prior art LTE-Advanced system, wherein all subframes in UL component carriers in FDD are defined for comprising a physical UL shared channel for HARQ feedback.

Figure 1:
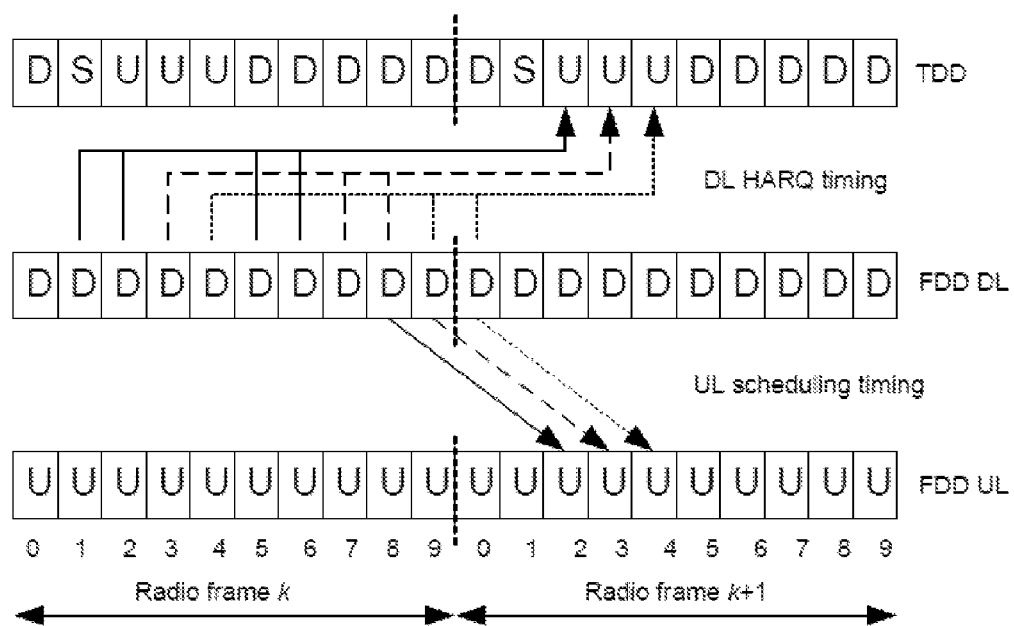
FIG. 1 is an illustration of TDD and FDD subframes according to prior art.

An example of such first and second UL subframe sets can be deduced from FIG. 1, wherein the first set comprises subframes 2, 3 and 4, while the second set comprises subframes 0, 1, 5, 6, 7, 8, 9. This is in contrast to the prior art FDD LTE system, where only the set comprising subframes 0, 1, 2, 3, 4, 5, 6, 7, 8, 9 exists.

Furthermore, the method allows for arranging the second DL HARQ timing such that it can also be used when the physical UL shared channel is transmitted on the TDD carrier. That could be possible if the associated subframe on the FDD UL carrier is also corresponding to an UL subframe on the TDD carrier. Applying the same DL HARQ timing is advantageous as the UE implementation complexity can be reduced due to using the same timing regardless of whether the physical UL shared channel is transmitted on an FDD UL carrier or a TDD carrier.

A further reduction of the implementation complexity could occur by arranging the second DL HARQ timing such that it is identical to the first DL HARQ timing (i.e., the DL HARQ timing where an association determines which UL subframes in the TDD carrier that are defined for transmitting HARQ feedback on the physical UL control channel (e.g., the PUCCH) for the associated DL subframes in the FDD carrier). Applying identical first and second DL HARQ timing is advantageous as the UE implementation complexity can be reduced due to using the same timing regardless of the physical UL channel being used for transmission.

HARQ feedback related to transmissions on the PCell can also be multiplexed into a physical UL shared channel transmitted on the SCell. This would also be applicable even if there is no HARQ feedback for the SCell itself.

One example of applying the method may therefore comprise: for a TDD serving cell; The DL HARQ timing for HARQ feedback transmitted on PUSCH is the same as the DL HARQ timing for HARQ feedback transmitted on PUCCH.

For an FDD serving cell; If the PUSCH is transmitted on a TDD serving cell, the DL HARQ timing for HARQ feedback transmitted on PUSCH is the same as the DL HARQ timing for HARQ feedback transmitted on PUCCH. If the PUSCH is transmitted on an FDD serving cell, the DL HARQ timing for HARQ feedback transmitted on PUSCH is determined according to the embodiments describing the second DL HARQ timing set forth in embodiments of this invention.

Figure 3:
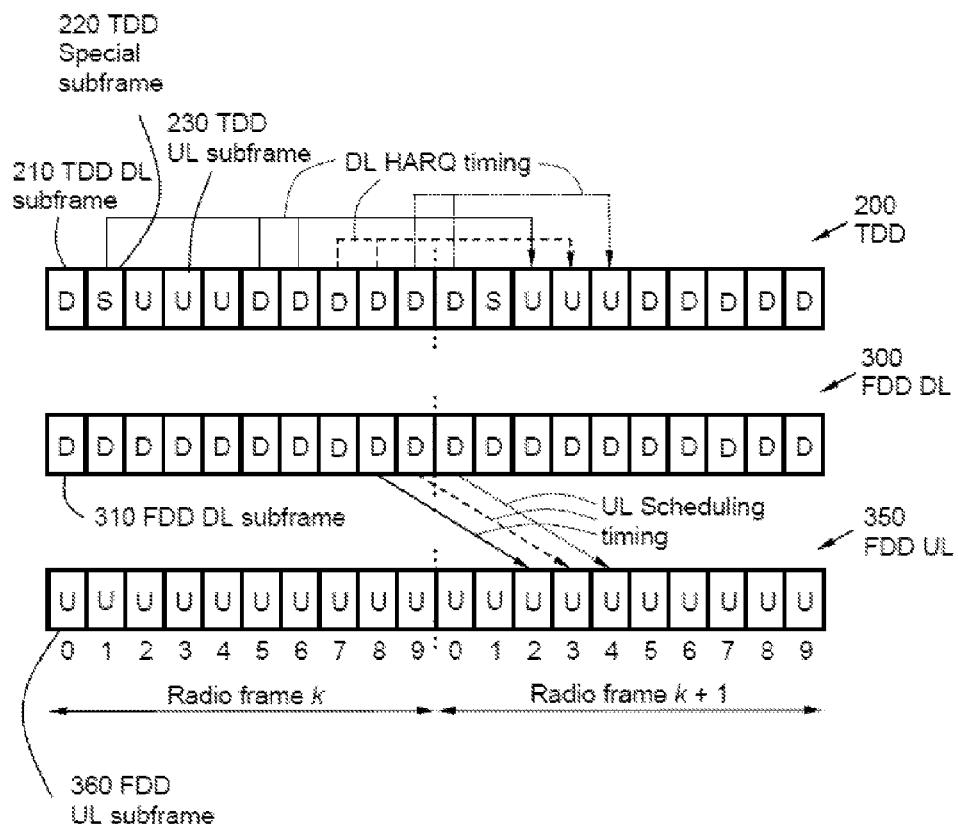
FIG. 3 is a block diagram illustrating radio frames in TDD/FDD according to some embodiments.

FIG. 3 illustrates an example of timing relations for an SCell using FDD and a PCell using TDD with a DL HARQ timing for the TDD carrier 200. A radio frame k of the TDD carrier 200 comprises DL subframes 210, special subframe 220 and uplink subframes 230.

The DL FDD carrier 300 comprises DL subframes 310 while the UL FDD carrier 350 comprises UL subframes 360.

If a physical UL shared channel is transmitted in subframe 2, 3 or 4, it may contain HARQ feedback from the TDD carrier 200 for subframes according to the association of the DL HARQ timing of the TDD carrier 200. Such a physical UL shared channel, may additionally comprise HARQ feedback related to the secondary serving cells, i.e., the DL FDD carrier 300.

For each UL subframe k in the TDD carrier 200, the set $M_k$ may be defined, which represents the associated DL subframes 310 on the FDD carrier 300 according to the DL HARQ timing. It is noted that the set $M_k$ may be empty for some k and that the elements in the set $M_k$ may represent subframes from different radio frames. Such a set $M_k$ might alternatively be referred to as a bundling window. An example of sets $M_k$ can be deduced from FIG. 1, wherein $M_2=\{1,2,5,6\}$, $M_3=\{3,7,8\}$ and $M_4=\{4,9,0\}$.

In some embodiments described herein, a physical UL shared channel which contains HARQ feedback, may comprise HARQ feedback for all DL subframes 310 of an associated bundling window. This is advantageous since otherwise, complex system operation may occur as it needs to be assured that the HARQ feedback for a DL subframe is not provided twice, i.e., first on the physical UL shared channel and then in a subsequent physical UL control channel transmission. For example in FIG. 4, there may be several UL subframes that may comprise a physical UL shared channel associated with $M_2$, but according to some embodiments, every such physical UL shared channel may comprise HARQ feedback for all subframes in $M_2$.

Due to processing delay in the receiver, i.e., the second communication device 120, the HARQ feedback for a transmission of a DL channel (e.g., physical DL shared channel, physical DL control channel, PDSCH, PDCCH, EPDCCH etc.) in subframe n, cannot be transmitted immediately in the same subframe, but may be transmitted in subframe n+Δ. In the prior art LTE/LTE-Advanced FDD system, it is assumed that for a physical UL shared channel or physical UL control channel containing HARQ feedback, Δ=4. Thus, the earliest subframe for which HARQ feedback may be transmitted on the physical UL shared channel for a given bundling window $M_k$ may be subframe n=max $M_k$+Δ. Since the maximum allowable round trip time delay depends on the DL HARQ timing, the latest subframe for which HARQ feedback can be transmitted on the physical UL shared channel for a given bundling window $M_k$ is subframe k. Alternatively this condition could be expressed by that HARQ feedback transmission on the physical UL shared channel will not have a larger round trip time delay than HARQ feedback transmission on the physical UL control channel. If an UL grant in subframe n schedules the physical UL shared channel in subframe n+δ, the latest subframe for transmitting the UL grant would thus be subframe k−δ for a given bundling window $M_k$, in order to assure that the HARQ feedback is not transmitted later than subframe k.

Figure 4:
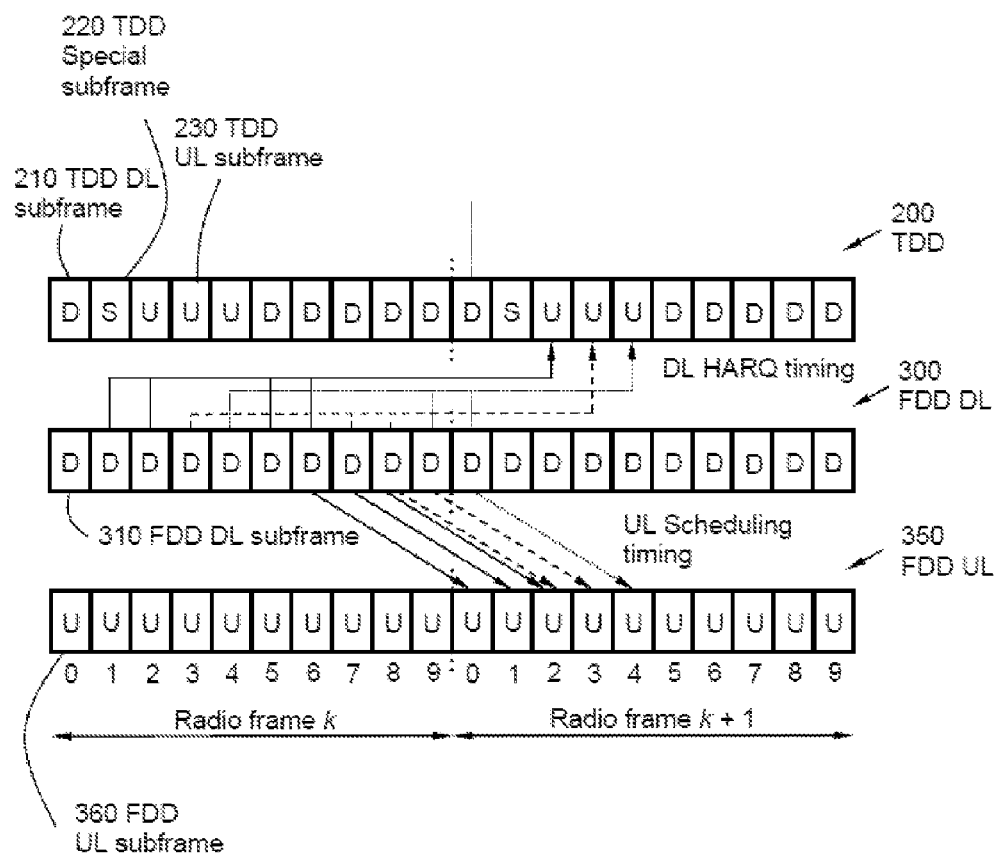
FIG. 4 is a block diagram illustrating radio frames in TDD/FDD according to some embodiments.

FIG. 4 illustrates an example of timing relations according to the invention for an SCell using FDD and a PCell using TDD where more than one UL subframe may contain HARQ feedback for a given bundling window.

An example of UL scheduling timing can be deduced from FIG. 4. HARQ feedback associated with $M_2$={1,2,5,6}, could be transmitted on a physical UL shared channel in anyone of the subframes n=0,1,2, in radio frame k+1, for which the associated UL grant is transmitted in subframe n=6,7,8, in radio frame k. HARQ feedback associated with $M_3$={3,7,8}, could be transmitted on a physical UL shared channel in anyone of the subframes n=2,3, in radio frame k+1, for which the associated UL grant is transmitted in subframe n=8,9, in radio frame k. HARQ feedback associated with $M_3$={4,9,0}, could be transmitted on a physical UL shared channel in subframes n=4, in radio frame k+1, for which the associated UL grant is transmitted in subframe n=0, in radio frame k+1.

An advantage of transmitting HARQ feedback on physical UL shared channel for a given bundling window $M_k$ earlier than subframe k is that the round trip time for the HARQ feedback of the FDD carrier 300 can be reduced. This implies that the transmitter, i.e., first communication device 110, or eNodeB, may perform a retransmission as quickly as possible, which minimises the latency. Thereby faster data delivery and higher data rates could be provided to the end-user.

An advantage of transmitting HARQ feedback on physical UL shared channel for a given bundling window $M_k$ in subframe k is that HARQ feedback from both the FDD carrier 300 and the TDD carrier 200 may be transmitted in the same physical UL shared channel. This may simplify the receiver in the first communication device 110. Subframe k may comprise HARQ feedback from the TDD carrier 200 if there is a non-empty bundling window, $M_k^{TDD}$, associated with subframe k. The set $M_k^{TDD}$ may be different than the set $M_k$ for the FDD carrier 300. One example of this is the DL HARQ timing of the TDD carrier 200 in FIG. 3 which is different from the DL HARQ timing of the FDD carrier 300 in FIG. 4, resulting in that different DL subframes 210 will be associated with UL subframe k=2.

In one embodiment of the invention, one single UL subframe 360, defined to transmit HARQ feedback on physical UL shared channel, may be associated with a bundling window. This single UL subframe 360 may be predetermined but adheres to the timing restriction that the earliest subframe for which HARQ feedback can be transmitted on the physical UL shared channel for a given bundling window $M_k$ is subframe n=max $M_k$+Δ and that the latest subframe for which HARQ feedback can be transmitted on the physical UL shared channel for a given bundling window $M_k$ is subframe n=k. One example of such a single UL subframe 360 for each bundling window is shown in FIG. 1. That is, DL subframes 1, 2, 5 and 6 are associated with UL subframe 2, DL subframes 3, 7 and 8 are associated with UL subframe 3 and DL subframes 4, 9 and 0 are associated with UL subframe 4. One advantage of defining one single UL subframe 360 for which HARQ feedback can be transmitted on the physical UL shared channel for a given bundling window $M_k$ is that it reduces decoding complexity in the first communication device 110. For example, if the second communication device 120 misses the UL grant, the second communication device 120 will not transmit the physical UL shared channel and consequently also not the HARQ information. If it were possible to use more than on UL subframe 360 for which HARQ feedback can be transmitted on the physical UL shared channel for a given bundling window, the first communication device 110 may on the other hand believe that the second communication device 120 did transmit the physical UL shared channel with HARQ feedback but that the first communication device 110 was unable to correctly decode it. For a physical UL shared channel of a subsequent UL grant, the first communication device 110 may therefore not expect HARQ information, while the second communication device 120 is indeed transmitting the HARQ information in the physical UL shared channel. This may create ambiguity in the first communication device 110 concerning the HARQ feedback.

In another embodiment of the invention, multiple UL subframes 230, defined to transmit HARQ feedback on the physical UL shared channel, may be associated with a bundling window. The UL subframes 230 adheres to the timing restriction that the earliest subframe 230 for which HARQ feedback can be transmitted on the physical UL shared channel for a given bundling window $M_k$ is subframe n=max $M_k$+Δ and that the latest subframe 230 for which HARQ feedback can be transmitted on the physical UL shared channel for a given bundling window $M_k$ is subframe n=k. One advantage of defining multiple UL subframes 230 is that the first communication device 110, or eNodeB, obtains more opportunities to transmit the HARQ feedback on the physical UL shared channel instead of the physical UL control channel, thus giving the first communication device 110, or eNodeB, more freedom in allocating resources among the physical UL shared channel and the physical UL control channel. This gives more flexibility for the data scheduler and could improve the spectral efficiency of the system 100. One example of such multiple UL subframes 230 for a bundling window is shown in FIG. 4, where $M_2$={1,2,5,6} is associated with n=0,1,2, and $M_3$={3,7,8} is associated with n=2,3.

In a further example of the embodiment, HARQ feedback corresponding to multiple bundling windows is transmitted in the same physical UL shared channel. One example of this is shown in FIG. 4, where subframe n=2 is associated with bundling windows $M_2$ and $M_3$.

In a further embodiment of the invention, it is disclosed to arrange HARQ feedback for N subframes for the case where less than N of the N DL subframes 310 in an FDD carrier 300 are associated with one or more UL subframes 230 in a TDD carrier 200 (e.g., the association is only defined for N−1 subframes). If HARQ feedback is only transmitted on the physical UL control channel, it implies that there will not be HARQ feedback for one or more of the DL subframes, which makes the subframe unusable. As a result, the data rate for the second communication device 120 will not be maximised. Moreover, such a subframe could only be utilised for a receiving second communication device 120, or UEs, not applying carrier aggregation, which may decrease the system spectral efficiency.

An example of said DL HARQ timing, (i.e., where N−1 of the N DL subframes in an FDD carrier are associated with one or more UL subframes 230 in a TDD carrier 200) is the DL HARQ timing for TDD UL-DL configuration 5 in the prior art LTE/LTE-Advanced system. However, the inability to use the non-associated subframe is avoided by the described method, by allowing HARQ feedback for this subframe on the physical UL shared channel only. Thus, according to some embodiments, DL HARQ timing for physical UL shared channel transmission may be determined for subframes which do not have an association according to the DL HARQ timing for physical UL control channel transmission. This may be achieved by either: i) determining a separate DL HARQ timing for subframes which do not have an association according to the DL HARQ timing for physical UL control channel transmission; or ii) determining the same DL HARQ timing for subframes which do not have an association according to the DL HARQ timing for physical UL control channel transmission, as for the other subframes.

Although the second communication device 120 may not have data to transmit in every UL subframe (and thus would not be scheduled any physical UL shared channel), the first communication device 110, or eNodeB, could schedule a physical UL shared channel transmission which only comprises UL control information, e.g., an aperiodic Channel State Information (CSI) report. Such a physical UL shared channel transmission may also accommodate HARQ feedback and therefore, the first communication device 110, or eNodeB, could assure that once it schedules a DL transmission in the said one non-associated subframe, it may also provide an UL grant for a physical UL shared channel to carry the HARQ feedback.

Figure 5:
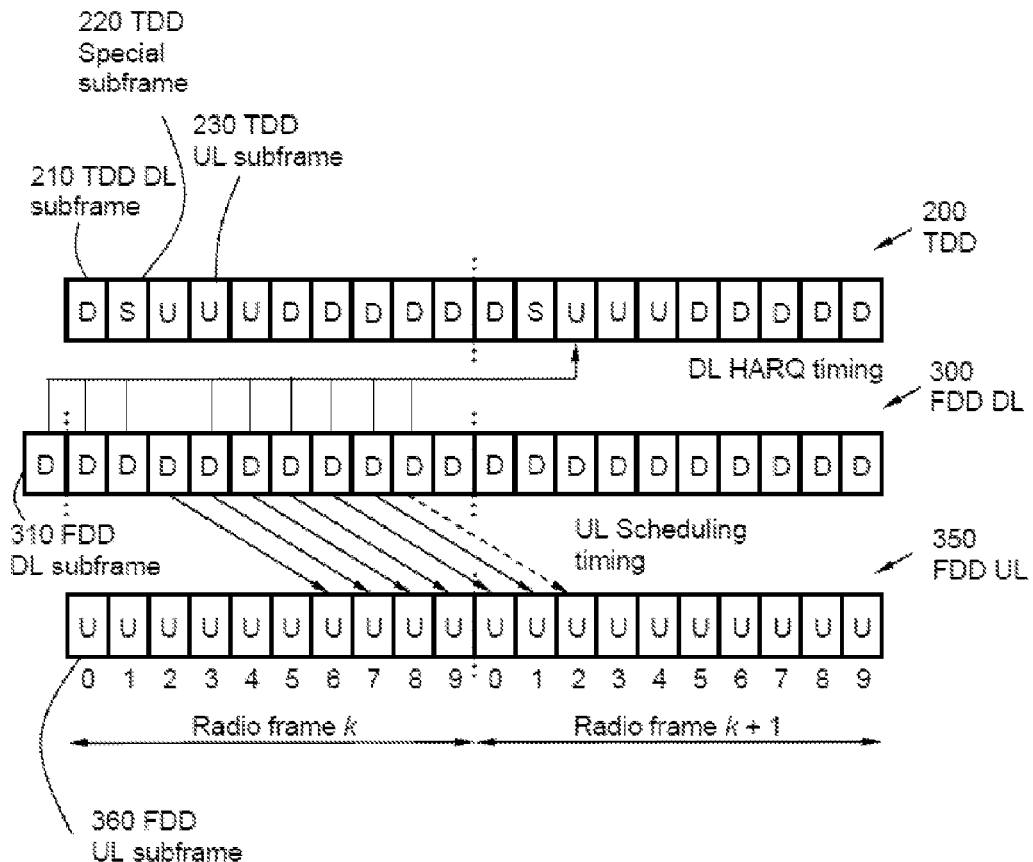
FIG. 5 is a block diagram illustrating radio frames in TDD/FDD according to some embodiments.

The embodiment is exemplified by FIG. 5 where subframe n=2 does not have an associated UL subframe 230 in the TDD carrier 200 according to the DL HARQ timing. HARQ feedback could then be transmitted in any of subframes n=6, 7, 8, 9, 0, 1 on the FDD UL carrier 350, which is illustrated by the solid arrows for the UL scheduling timing. This would correspond to embodiment i). Moreover, in UL subframe n=2, which is illustrated by the dashed arrow for the UL scheduling timing, the physical UL shared channel may contain HARQ feedback from DL subframe n=2 but also for all the other DL subframes (i.e., subframes 9, 0, 1, 3, 4, 5, 6, 7, 8) which are associated with this UL subframe according to the DL HARQ timing. This would correspond to embodiment ii).

FIG. 5 thus illustrates an example of timing relations for an SCell using FDD and a PCell using TDD where more than one DL subframe 310 is not associated with an UL subframe 230 in the TDD carrier 200 according to the DL HARQ timing for HARQ feedback on the physical UL control channel.

In the first set of UL subframes disclosed herein, for which a physical UL shared channel may contain HARQ feedback, UL grants may contain a DAI in order to be able to determine the amount of HARQ feedback (i.e., the number of bits) on the physical UL shared channel. However, on the second set of UL subframes for which a physical UL channel may not contain HARQ feedback, it is disclosed that UL grants do not need to contain a DAI. In the prior art LTE system, UL grants are transmitted by Downlink Control Information (DCI) format 0, contained in the Physical DL Control Channel (PDCCH) or Enhanced PDCCH (EPDCCH). The length (i.e., number of bits) of DCI format 0 is matched to that of DCI format 1A, which is a DL assignment format which may be used for robust DL assignments. If the number of information bits in DCI format 0 is not the same as that of DCI format 1A, zeros are appended for the shortest DCI format until the number of bits become the same. This is to assure that the second communication device 120, e.g. UE, can simultaneously decode DCI format 0 and 1A and a specific bit in the DCI determines which of the two formats that is transmitted. Thus the size of DCI format 1A depends on the size of DCI format 0.

Occasionally, the first communication device 110 may need to reconfigure some of its system parameters and procedures, e.g., the HARQ timing. There may then occur ambiguity periods during which the first communication device 110 does not know whether the second communication device 120 has applied the new configuration or is using the old configuration. For such cases, it may be possible to schedule the second communication device 120 in a robust fashion and DCI format 1A is suitable for this. Therefore, the size of DCI format 1A may not vary between subframes since that may lead to ambiguity regarding its size. Since, the size of DCI format 1A is tied to the size of DCI format 0; it is preferable that the size of DCI format 0 also does not vary between subframes.

In some embodiments, a DAI field is present in UL grants for all subframes in the radio frame, i.e., both the first and the second set. For the second set of UL subframes, for which a physical UL shared channel may not contain HARQ feedback, embodiments for utilising the DAI is as follows.

In one embodiment, the DAI field in UL grants is reserved and is not used for containing any DAI. This implies that the second communication device 120 can decode the DCI as if the DCI contains DAI, but it is not supposed to extract any information bits from the DAI field. An advantage of this is that the second communication device 120 may use the same decoding operation for the DCI in all subframes.

In one embodiment, the bits in the DAI field in UL grants are set to predefined values. An advantage of these predefined values is that they can be utilised by the second communication device 120 in the decoding process by a skilled person in the art. This a priori information could decrease the detection error probability of the DCI and decrease the probability of false detection (i.e., an erroneously decoded DCI is declared as successfully detected). The predefined values could thus help to determine whether the DCI was correctly decoded, i.e., they would function as a virtual Cyclic Redundancy Check (CRC) code. This implies that the error probability of decoding the DCI could decrease.

In one embodiment, the bits in the DAI field in UL grants are used to complement the DAI field in the DL assignments. That is in a subframe, where the first communication device 110 has scheduled both a DL assignment and an UL grant on the serving cell, the value of the DAI in the UL grant is set to be the same as the DAI value in the DL assignment. This would provide information for the second communication device 120 such that it could determine whether it has missed the last DL assignment. In subframes where there is no DL assignment, the DAI in the UL grant may be set to a predefined value, e.g., the maximum value.

Figure 6:
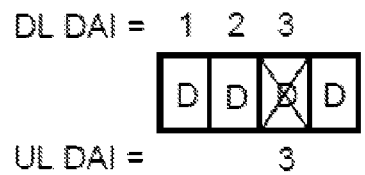
FIG. 6 is a block diagram illustrating DAI according to some embodiments.

FIG. 6 illustrates an example where the second communication device 120 misses a DL assignment in the third subframe.

An example is shown in FIG. 6, where DL assignments have been scheduled in the first three subframes, with the corresponding DL assignment DAIs values 1, 2 and 3. The DL assignment in the third subframe is missed and the second communication device 120 is unaware of the DL DAI value 3. However, a successful reception of an UL grant in the third subframe comprising an UL grant DAI value equal to 3, will facilitate that the second communication device 120 may determine that the DL assignment in the third subframe has been missed.

The method may further in some embodiments be applicable where the UL grant has been transmitted on one FDD SCell and the scheduled physical UL shared channel is transmitted on another FDD SCell. In some instances, method embodiments may be applicable to where the physical UL shared channel is transmitted in a primary serving cell utilising TDD.

Figure 7:
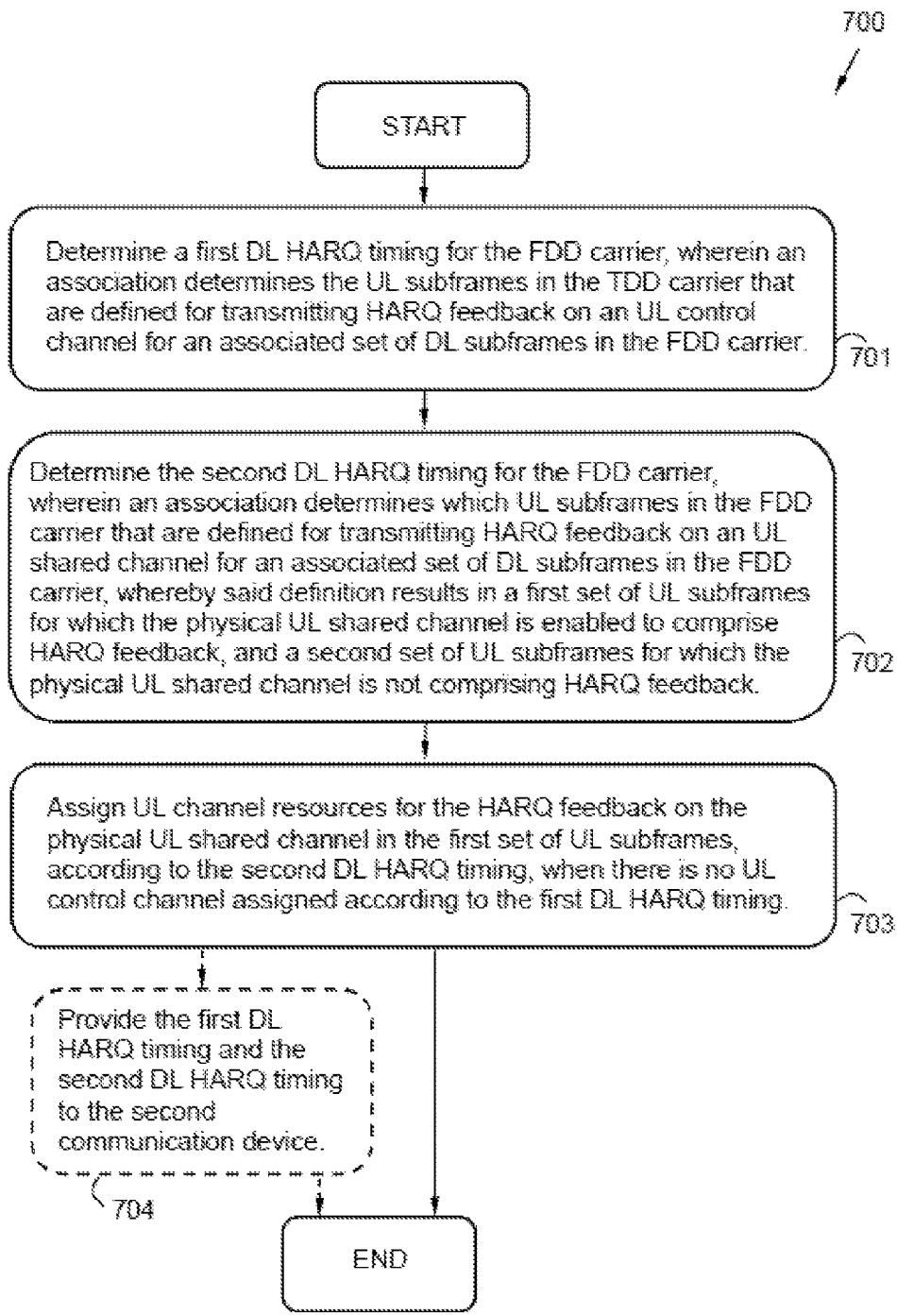
FIG. 7 is a flow chart illustrating a method in a first communication device according to an embodiment.

FIG. 7 is a flow chart illustrating embodiments of a method 700 in a first communication device 110. The method 700 aims at assigning UL channel resources by determining a first DL HARQ timing for a FDD carrier 300 and a second DL HARQ timing for the FDD carrier 300, for enabling a second communication device 120 to provide HARQ feedback on a physical UL shared channel in a communication system 100 based on TDD and FDD carrier aggregation of at least one TDD carrier 200 and at least one FDD carrier 300, 350.

The first communication device 110 may comprise e.g., a radio network node such as an evolved NodeB (eNodeB). The communication network 100 may be based on 3rd Generation Partnership Project Long Term Evolution (3GPP LTE). Further, the communication system 100 may be based on FDD and/or TDD. The second communication device 120 may comprise a User Equipment (UE) in some embodiments.

For each UL subframe k in the TDD carrier 200 according to some embodiments, a set $M_k$ may represent associated DL subframes 310 on the FDD carrier 300.

Furthermore, according to some embodiments, the DL subframe 310 may comprise a Physical Downlink Shared Channel (PDSCH) in the DL FDD carrier 300. The DL subframe 210 may comprise a Physical Downlink Shared Channel (PDSCH) in the TDD carrier 200. The UL control channel subframe 360 may comprise a Physical Uplink Control Channel (PUCCH), in the UL TDD carrier 200. The physical UL shared channel may comprise a Physical Uplink Shared Channel (PUSCH) in the TDD carrier 200 and/or in the FDD carrier 350.

Further, in some embodiments, a Downlink Assignment Index (DAI) field may be present in UL grants for all subframes in the radio frame, i.e., both the first and the second UL subframe set.

The DAI field in the second set in UL grants may not be used for containing any DAI, but may be kept for reserved purpose in some embodiments.

Furthermore, the bits in the DAI field in UL grants may be set to predefined values.

According to some embodiments, a subframe where the second communication device 120 is scheduled both a DL assignment and an UL grant in the FDD carrier 350, the value of the DAI in the UL grant may be set to be the same as the DAI value in the DL assignment.

To appropriately provide assignment of UL channel resources, the method 700 may comprise a number of actions 701-704.

It is however to be noted that any, some or all of the described actions 701-704, may be performed in a somewhat different chronological order than the enumeration indicates, be performed simultaneously or even be performed in a completely reversed order according to different embodiments. Some actions may be performed within some alternative embodiments such as e.g., action 704. Further, it is to be noted that some actions may be performed in a plurality of alternative manners according to different embodiments, and that some such alternative manners may be performed only within some, but not necessarily all embodiments. The method 700 may comprise the following actions:

Action 701

The first DL HARQ timing for the FDD carrier 300 is determined, wherein an association determines which UL subframes 230 in the TDD carrier 200 that are defined for transmitting HARQ feedback on an UL control channel for an associated set of DL subframes 310 in the FDD carrier 300.

In some embodiments, the first DL HARQ timing may be identical with the second DL HARQ timing, i.e., such as having the same delay.

The first DL HARQ timing may comprise a timing defined by 3rd Generation Partnership Project (3GPP) Long Term Evolution (LTE), release 8, 9, 10 and/or 11, according to some embodiments.

The first DL HARQ timing may be determined such that at most N−1 of N consecutive DL subframes 310 in the FDD carrier 300 are associated with one or more UL subframes 230 in a TDD carrier 200, and wherein HARQ feedback transmission is enabled only for the non-associated subframe on the physical UL shared channel, in some embodiments.

A separate DL HARQ timing may be determined in some embodiments, for HARQ feedback on the physical UL shared channel for subframes which do not have an association according to the determined first DL HARQ timing for the UL control channel transmission.

In some alternative embodiments, the same DL HARQ timing may be determined for HARQ feedback on the physical UL shared channel for subframes which do not have an association according to the determined first DL HARQ timing for the UL control channel transmission, as for the associated subframes.

Action 702

The second DL HARQ timing for the FDD carrier 300 is determined, wherein an association determines which UL subframes 360 in the FDD carrier 350 that are defined for transmitting HARQ feedback on an UL shared channel for an associated set of DL subframes 310 in the FDD carrier 300. The determination results in a first set of UL subframes for which the physical UL shared channel is enabled to comprise HARQ feedback. Also, the definition results in a second set of UL subframes for which the physical UL shared channel is not able of comprising HARQ feedback.

The determined second DL HARQ timing may be used in some embodiments, to determine which UL subframes 230 in the TDD carrier 200 that are defined for transmitting HARQ feedback on a physical UL shared channel for an associated set of DL subframes 310 in the FDD carrier 300.

In some optional embodiments, the second DL HARQ feedback timing for HARQ feedback on the physical UL channel may be determined such that HARQ feedback is enabled on the physical UL shared channel in the FDD carrier 350, for a given set $M_k$ on the FDD carrier from subframe n=max $M_k+\Delta$ to subframe n=k where $\Delta$ is an offset value.

The offset value $\Delta$ may be set to at least 4 in some embodiments. Thus $\Delta \geq 4$.

In some embodiments, one single UL subframe 360, defined to transmit HARQ feedback on the physical UL shared channel, may be associated with a set $M_k$.

However, in some embodiments, multiple UL subframes 360, defined to transmit HARQ feedback on the physical UL shared channel, may be associated with a set $M_k$.

Action 703

UL channel resources are assigned for the HARQ feedback on the physical UL shared channel in said first set of UL subframes, according to said second DL HARQ timing, when there is no UL control channel assigned according to said first DL HARQ timing.

The assigning of UL shared channel resources may further comprise scheduling of the physical UL shared channel by the first communication device 110.

Action 704

This action may be performed within some, but not all embodiments.

The determined 701 first DL HARQ timing and the determined 702 second DL HARQ timing may be provided, such as e.g., transmitted, to the second communication device 120.

The first DL HARQ timing and the second DL HARQ timing may be provided in form of predetermined timing values, or signalling of the respective timing values, in different embodiments.

Figure 8:
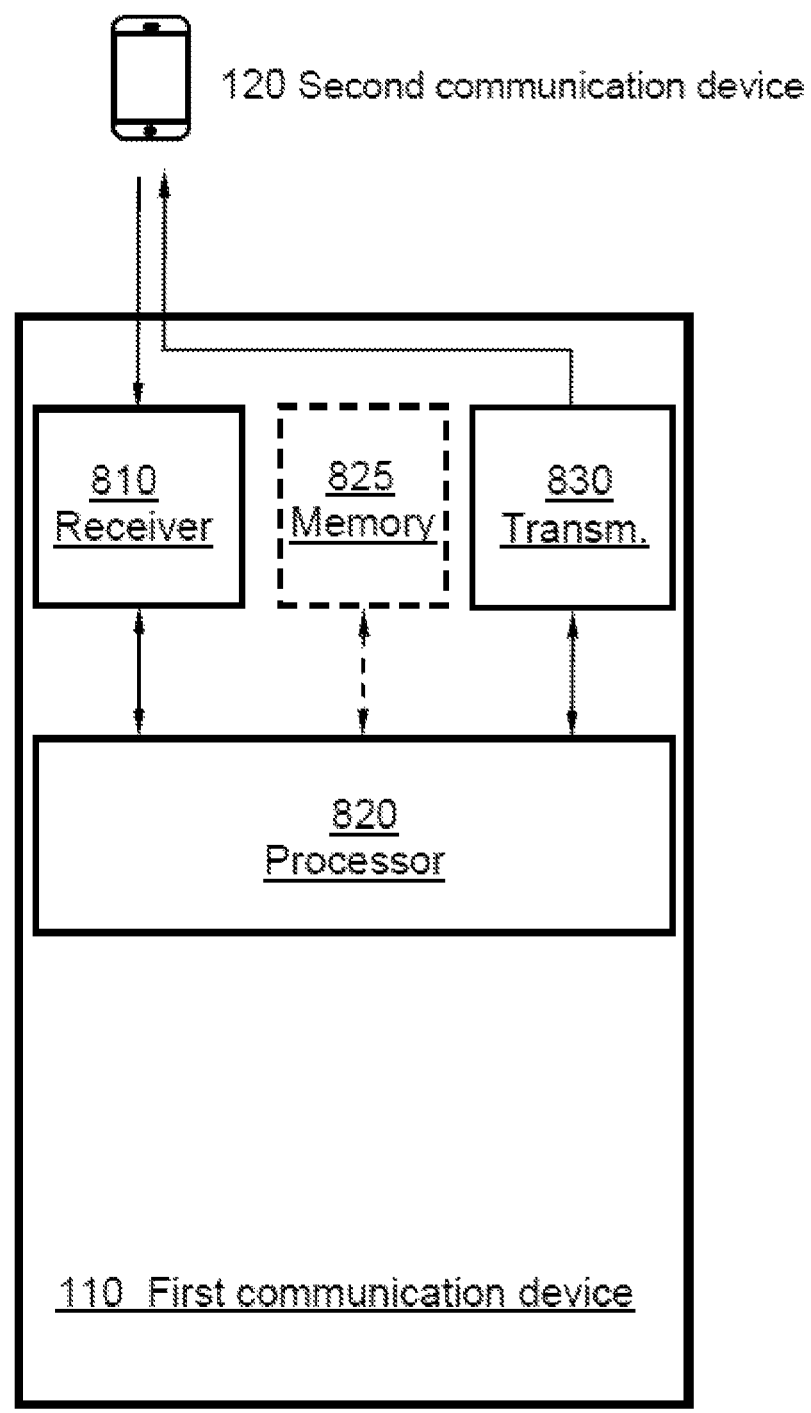
FIG. 8 is a block diagram illustrating a first communication device according to an embodiment.

FIG. 8 illustrates an embodiment of a first communication device 110, i.e., a radio network node or eNodeB, comprised in a communication system 100. The first communication device 110 is configured for performing at least some of the previously described method actions 701-704, for assignment of uplink channel resources, for enabling a second communication device 120 such as a UE, to provide HARQ feedback for data transmitted in the downlink using carrier aggregation of at least one downlink FDD carrier 300, 350 and at least one TDD carrier 200.

The first communication device 110 may comprise e.g., a radio network node such as an evolved NodeB (eNodeB). The communication network 100 may be based on 3rd Generation Partnership Project Long Term Evolution (3GPP LTE). Further, the communication system 100 may be based on FDD and/or TDD. The second communication device 120 may comprise a User Equipment (UE) in some embodiments.

For each UL subframe k in the TDD carrier 200 according to some embodiments, a set $M_k$ may represent associated DL subframes 310 on the FDD carrier 300.

Furthermore, according to some embodiments, the DL subframe 310 may comprise a Physical Downlink Shared Channel (PDSCH) in the DL FDD carrier 300. The DL subframe 210 may comprise a Physical Downlink Shared Channel (PDSCH) in the TDD carrier 200. The UL control channel subframe 360 may comprise a Physical Uplink Control Channel (PUCCH), in the UL TDD carrier 200. The physical UL shared channel may comprise a Physical Uplink Shared Channel (PUSCH) in the TDD carrier 200 and/or in the FDD carrier 350.

The first communication device 110 comprises a processor 820, configured for determining the first DL HARQ timing for the FDD carrier 300, wherein an association determines which UL subframes 230 in the TDD carrier 200 that are defined for transmitting HARQ feedback on an UL control channel for an associated set of DL subframes 310 in the FDD carrier 300. Also, the processor 820 is configured for determining the second DL HARQ timing for the FDD carrier 300, wherein an association determines which UL subframes 360 in the FDD carrier 350 that are defined for transmitting HARQ feedback on an UL shared channel for an associated set of DL subframes 310 in the FDD carrier 300, whereby said determination results in a first set of UL subframes for which the physical UL shared channel is enabled to comprise HARQ feedback, and a second set of UL subframes for which the physical UL shared channel is not able of comprising HARQ feedback. Further, the processor 820 is configured for assigning UL channel resources for the HARQ feedback on the physical UL shared channel in said first set of UL subframes, according to said second DL HARQ timing, when there is no UL control channel assigned according to said first DL HARQ timing.

Such processor 820 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

In addition the first communication device 110 may comprise a transmitter 830, configured for transmitting data on said DL FDD carrier 300 and/or TDD carrier 200, to be received by the second communication device 120. The transmitter 830 may thus be configured for transmitting wireless signals to the second communication device 120, or UE.

Furthermore, in some embodiments, the first communication device 110 may comprise a receiver 810, configured for receiving HARQ feedback from the second communication device 120, related to the transmitted DL data. Such receiver 810 in the first communication device 110 may be configured for receiving wireless signals from the second communication device 120, or UE or any other entity configured for wireless communication over a wireless interface according to some embodiments.

In addition according to some embodiments, the first communication device 110 may in some embodiments also comprise at least one memory 825 in the first communication device 110. The optional memory 825 may comprise a physical device utilised to store data or programs, i.e., sequences of instructions, on a temporary or permanent basis. According to some embodiments, the memory 825 may comprise integrated circuits comprising silicon-based transistors. Further, the memory 825 may be volatile or non-volatile.

The actions 701-704 to be performed in the first communication device 110 may be implemented through the one or more processors 820 in the first communication device 110 together with computer program product for performing the functions of the actions 701-704.

Thus a computer program comprising program code for performing the method 700 according to any of actions 701-704, for assignment of UL channel resources by determining a first DL HARQ timing for a FDD carrier 300 and a second DL HARQ timing for the FDD carrier 300, for enabling a second communication device 120 to provide HARQ feedback on a physical UL shared channel in a communication system 100 based on TDD and FDD carrier aggregation of at least one TDD carrier 200 and at least one FDD carrier 300, 350, when the computer program is loaded into the processor 820 in the first communication device 110.

Furthermore, a computer program product is provided, comprising a computer readable storage medium storing program code thereon for assignment of UL channel resources by determining a first DL HARQ timing for a FDD carrier 300 and a second DL HARQ timing for the FDD carrier 300, for enabling a second communication device 120 to provide HARQ feedback on a physical UL shared channel in a communication system 100 based on Time-Division Duplexing, TDD, and FDD carrier aggregation of at least one TDD carrier 200 and at least one FDD carrier 300, 350, wherein the program code comprises instructions for executing a method 700, comprising: determining 701 the first DL HARQ timing for the FDD carrier 300, wherein an association determines which UL subframes 230 in the TDD carrier 200 that are defined for transmitting HARQ feedback on an UL control channel for an associated set of DL subframes 310 in the FDD carrier 300. Also, the method 700 comprises determining 702 the second DL HARQ timing for the FDD carrier 300, wherein an association determines which UL subframes 360 in the FDD carrier 350 that are defined for transmitting HARQ feedback on a physical UL shared channel for an associated set of DL subframes 310 in the FDD carrier 300, whereby said definition 702 results in a first set of UL subframes for which the physical UL shared channel enabled to comprise HARQ feedback, and a second set of UL subframes for which the physical UL shared channel is not able of comprising HARQ feedback. Further, the method 700 also comprises assigning 703 UL channel resources for the HARQ feedback on the physical UL shared channel in said first set of UL subframes, according to said second DL HARQ timing, when there is no UL control channel assigned according to said first DL HARQ timing.

The computer program product mentioned above may be provided for instance in the form of a data carrier carrying computer program code for performing at least some of the actions 701-704 according to some embodiments when being loaded into the processor 820. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the first communication device 110, e.g., over an Internet or an intranet connection.

Figure 9:
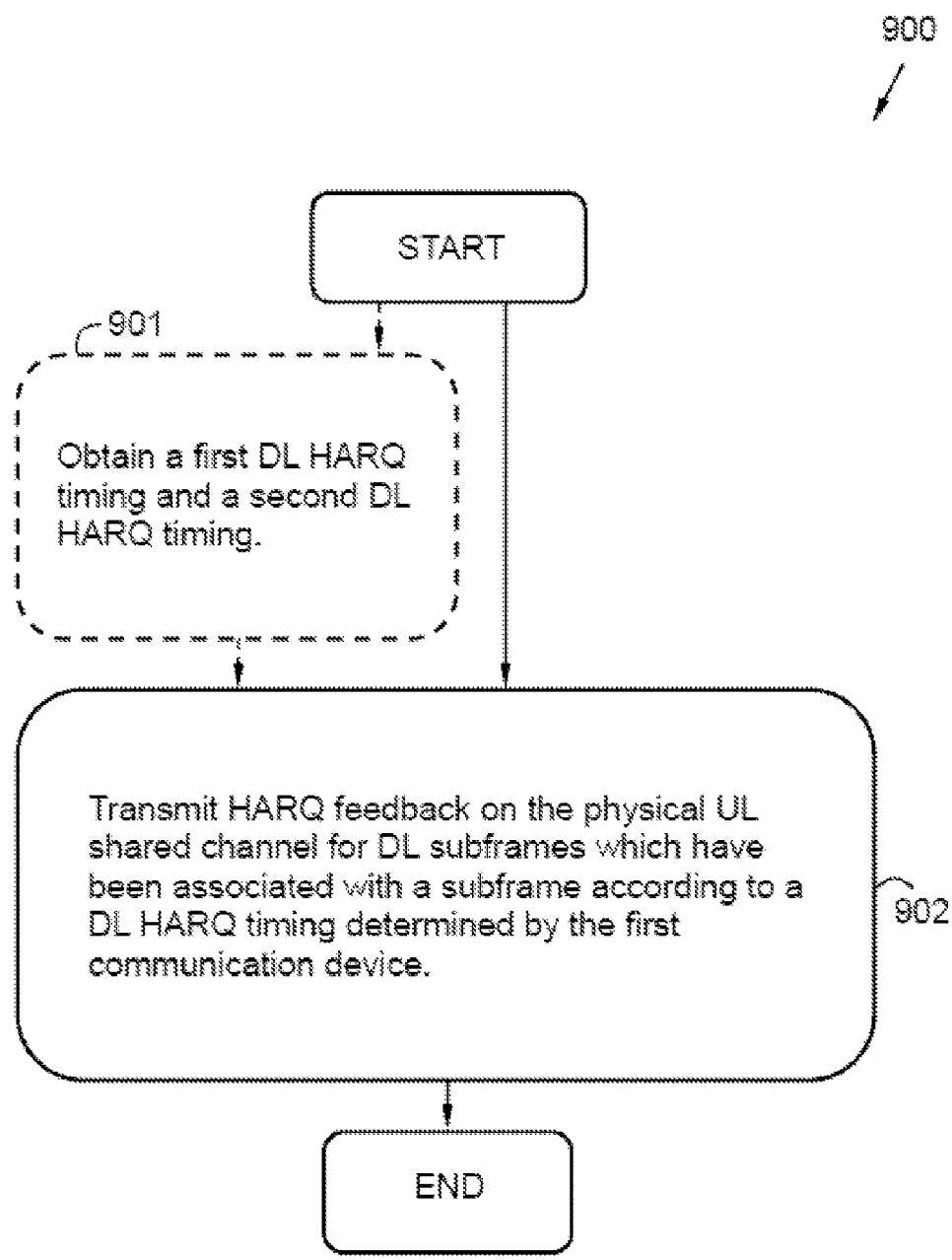
FIG. 9 is a flow chart illustrating a method in a second communication device according to an embodiment.

FIG. 9 is a flow chart illustrating embodiments of a method 900 in a second communication device 120 in a communication system 100. The method 900 aims at providing HARQ feedback for data received in the downlink using carrier aggregation of a downlink Frequency-Division Duplexing (FDD) carrier 300 and at least one Time-Division Duplexing (TDD) carrier 200, in a physical UL shared channel resource, according to an assignment made by a first communication device 110.

The second communication device 120 may comprise a User Equipment (UE). The first communication device 110 may comprise a radio network node, or eNodeB. The communication network 100 may be based on 3GPP LTE. Further, the communication system 100 may be based on FDD and/or TDD in different embodiments.

Furthermore, according to some embodiments, the DL subframe 310 may comprise a Physical Downlink Shared Channel (PDSCH) in the DL FDD carrier 300. The DL subframe 210 may comprise a Physical Downlink Shared Channel (PDSCH) in the TDD carrier 200. The UL control channel subframe 360 may comprise a Physical Uplink Control Channel (PUCCH), in the UL TDD carrier 200. The physical UL shared channel may comprise a Physical Uplink Shared Channel (PUSCH) in the TDD carrier 200 and/or in the FDD carrier 350.

To appropriately provide HARQ feedback, the method 900 may comprise a number of actions 901-902.

It is however to be noted that any, some or all of the described actions 901-902, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 900 may comprise the following actions:

Action 901

This action may be performed within some, but not all embodiments.

The first DL HARQ timing and the second DL HARQ timing, determined by the first communication device 110 may be obtained. In some embodiments, the respective DL HARQ timings may be obtained from a list in a memory. In other embodiments, the first DL HARQ timing and the second DL HARQ timing may be transmitted by the first communication device 110.

Action 902

A HARQ feedback is transmitted on the physical UL shared channel for DL subframes which have been associated with a subframe according to a DL HARQ timing determined by the first communication device 110.

The HARQ feedback may comprise an acknowledgement (ACK) for data determined to have been correctly received, a non-acknowledgement (NACK) for data determined to not having been correctly received and/or a Discontinuous Transmission (DTX) for data not having been received.

Figure 10:
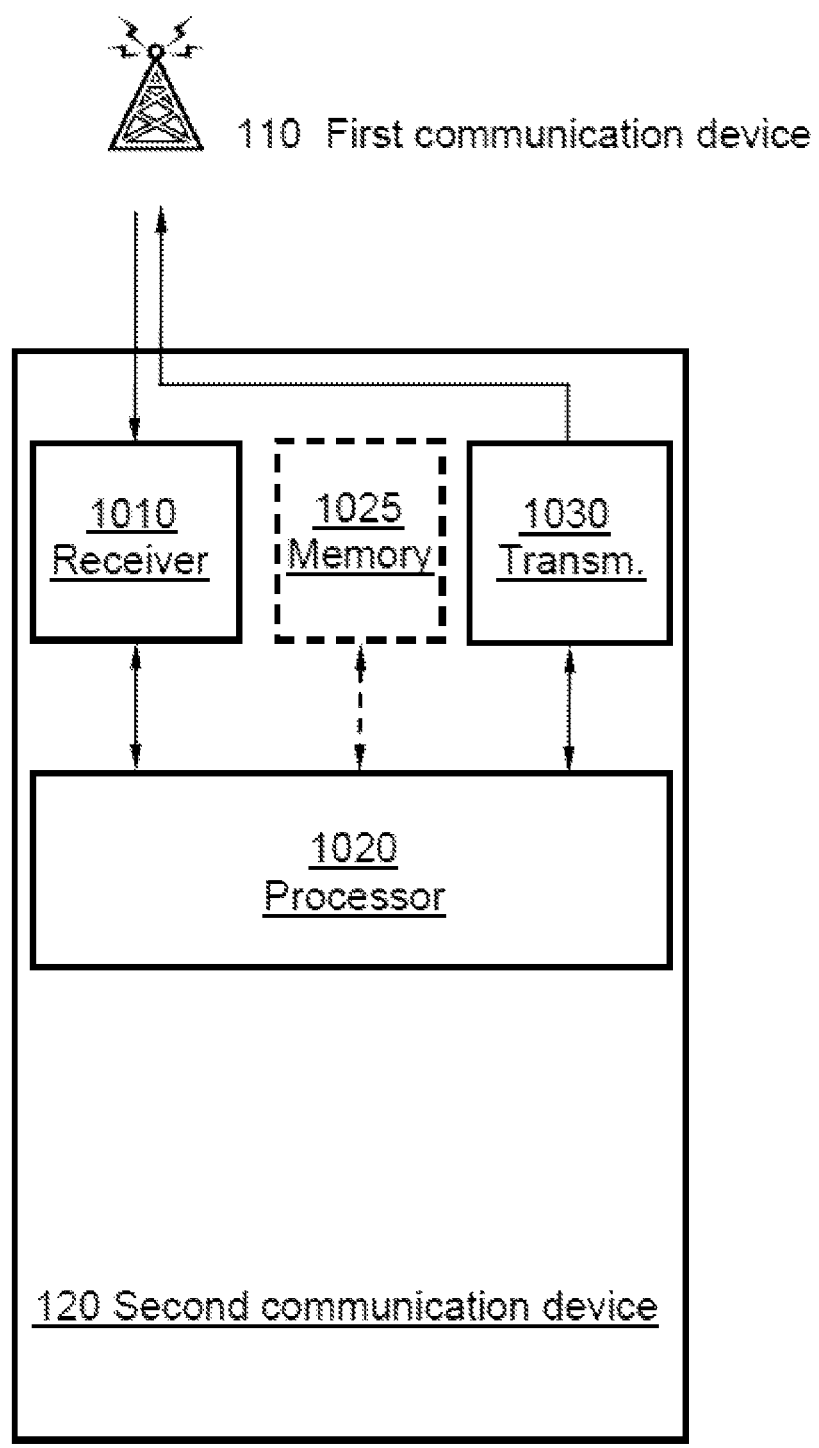
FIG. 10 is a block diagram illustrating a second communication device according to an embodiment.

FIG. 10 illustrates an embodiment of a second communication device 120 comprised in a communication system 100. The second communication device 120 is configured for performing at least some of the previously described method actions 901-902, for providing HARQ feedback on a physical UL shared channel, in a communication system 100 based on Time-Division Duplexing, TDD and Frequency Division Duplexing, FDD carrier aggregation of at least one TDD carrier 200 and at least one FDD carrier 300, 350, according to an assignment made by a first communication device 110.

The second communication device 120 may comprise a User Equipment (UE). The first communication device 110 may comprise an evolved NodeB (eNodeB). The communication network 100 may be based on 3GPP LTE. Further, the wireless communication system 100 may be based on FDD and/or TDD in different embodiments.

Further, the second communication device 120 comprises a transmitter 1030, configured for transmitting HARQ feedback on the physical UL shared channel for DL subframes which have been associated with a subframe according to a DL HARQ timing determined by the first communication device 110.

In some embodiments, the second communication device 120 may comprise a processor 1020, which may be configured for obtaining the first DL HARQ timing and the second DL HARQ timing, determined by the first communication device 110 in some embodiments.

Such processor 1020 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the second communication device 120 may comprise a receiver 1010, configured for receiving data on downlink subframes 310 on a downlink data channel of a FDD carrier 300 and/or on downlink subframes 210 on a downlink data channel of a TDD carrier 200.

In addition, the second communication device 120 in some embodiments may also comprise at least one memory 1025. The optional memory 1025 may comprise a physical device utilised to store data or programs, i.e., sequences of instructions, on a temporary or permanent basis. According to some embodiments, the memory 1025 may comprise integrated circuits comprising silicon-based transistors. Further, the memory 1025 may be volatile or non-volatile.

The actions 901-902 to be performed in the second communication device 120 may be implemented through the one or more processors 1020 in the second communication device 120 together with computer program product for performing the functions of the actions 901-902.

Thus a computer program comprising program code for performing the method 900 according to any of actions 901-902, for providing HARQ feedback on a physical UL shared channel, in a communication system 100 based on TDD and FDD carrier aggregation of at least one TDD carrier 200 and at least one FDD carrier 300, 350, according to an assignment made by a first communication device 110, when the computer program is loaded into the processor 1020 in the second communication device 120.

Furthermore, a computer program product is provided, comprising a computer readable storage medium storing program code thereon for providing HARQ feedback on a physical UL shared channel, in a communication system 100 based on TDD and FDD carrier aggregation of at least one TDD carrier 200 and at least one FDD carrier 300, 350, according to an assignment made by a first communication device 110. The program code comprises instructions for executing the method 900, comprising: transmitting 902 HARQ feedback on the physical UL shared channel for DL subframes which have been associated with a subframe according to a DL HARQ timing determined by the first communication device 110.

The computer program product mentioned above may be provided for instance in the form of a data carrier carrying computer program code for performing at least some of the actions 901-902 according to some embodiments when being loaded into the processor 1020. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the second communication device 120, e.g., over an Internet or an intranet connection.

The terminology used in the description of the embodiments as illustrated in the accompanying drawings is not intended to be limiting of the described methods 700, 900; the first communication device 110 and/or second communication device 120. Various changes, substitutions and/or alterations may be made, without departing from the invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g., a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A method in a first communication device, for assignment of uplink (UL) channel resources by determining a first downlink (DL) Hybrid Automatic Repeat request (HARQ) timing for a Frequency-Division Duplexing (FDD) carrier and a second DL HARQ timing for the FDD carrier for enabling a second communication device to provide HARQ feedback on a physical UL shared channel in a communication system based on Time-Division Duplexing, TDD, and FDD carrier aggregation of at least one TDD carrier and at least one FDD carrier, wherein the method comprises:
    determining the first DL HARQ timing for the FDD carrier, wherein an association determines which UL subframes in the TDD carrier that are defined for transmitting HARQ feedback on an UL control channel for an associated set of DL subframes in the FDD carrier,
    determining the second DL HARQ timing for the FDD carrier, wherein an association determines which UL subframes in the FDD carrier that are defined for transmitting HARQ feedback on an UL shared channel for an associated set of DL subframes in the FDD carrier, whereby said determination results in a first set of UL subframes for which the physical UL shared channel is enabled to comprise HARQ feedback, and a second set of UL subframes for which the physical UL shared channel is not comprising HARQ feedback, and
    assigning UL channel resources for the HARQ feedback on the physical UL shared channel in said first set of UL subframes, according to said second DL HARQ timing, when there is no UL control channel assigned according to said first DL HARQ timing, wherein the determined second DL HARQ timing is used to determine which UL subframes in the TDD carrier that are defined for transmitting HARQ feedback on a physical UL shared channel for an associated set of DL subframes in the FDD carrier.

2. The method according to claim 1, wherein assigning UL shared channel resources further comprises scheduling of the physical UL shared channel by the first communication device.

3. The method according to claim 1, wherein the first DL HARQ timing is identical with the second DL HARQ timing.

4. The method according to claim 1, wherein, for each UL subframe k in the TDD carrier, a set $M_k$ represents associated DL subframes on the FDD carrier, and wherein the second DL HARQ feedback timing for HARQ feedback on the physical UL channel is determined such that HARQ feedback is enabled on the physical UL shared channel in the FDD carrier, for the set $M_k$ on the FDD carrier from subframe n=max $M_k+\Delta$ to subframe n=k where $\Delta$ is an offset value.

5. The method according to claim 1, wherein one single UL subframe, defined to transmit HARQ feedback on the physical UL shared channel, is associated with a set $M_k$.

6. The method according to claim 1, wherein multiple UL subframes, defined to transmit HARQ feedback on the physical UL shared channel, are associated with a set $M_k$.

7. The method according to claim 1, wherein the first DL HARQ timing is determined such that at most N-1 of N consecutive DL subframes in the FDD carrier are associated with one or more UL subframes in a TDD carrier, and wherein the method further comprises only enabling HARQ feedback transmission for the non-associated subframe/s on the physical UL shared channel.

8. The method according to claim 1, wherein a Downlink Assignment Index, DAI, field is present in UL grants for all subframes in the radio frame, i.e., both the first and the second UL subframe set.

9. The method according to claim 8, wherein the DAI field in the second set in UL grants is not used for containing any DAI, but is kept for reserved purpose.

10. The method according to claim 8, wherein the bits in the DAI field in UL grants are set to predefined values.

11. The method according to claim 8, wherein, in a subframe, where the second communication device is scheduled both a DL assignment and an UL grant in the FDD carrier, the value of the DAI in the UL grant is set to be the same as the DAI value in the DL assignment.

12. A first communication device, for assignment of (UL) channel resources by determining a first downlink (DL) Hybrid Automatic Repeat request (HARQ) timing for a Frequency-Division Duplexing (FDD) carrier and a second DL HARQ timing for the FDD carrier, for enabling a second communication device to provide HARQ feedback on a physical UL shared channel in a communication system based on TDD and FDD carrier aggregation of at least one TDD carrier and at least one FDD carrier, the first communication device comprising a processor and a non-transitory computer readable storage medium storing program code thereon that, when executed by the processor perform the steps comprising:

determining the first DL HARQ timing for the FDD carrier, wherein an association determines which UL subframes in the TDD carrier that are defined for transmitting HARQ feedback on an UL control channel for an associated set of DL subframes in the FDD carrier, determining the second DL HARQ timing for the FDD carrier, wherein an association determines which UL subframes in the FDD carrier that are defined for transmitting HARQ feedback on an UL shared channel for an associated set of DL subframes in the FDD carrier, whereby said determination results in a first set of UL subframes for which the physical UL shared channel is enabled to comprise HARQ feedback, and a second set of UL subframes for which the physical UL shared channel is not comprising HARQ feedback, and assigning UL channel resources for the HARQ feedback on the physical UL shared channel in said first set of UL subframes, according to said second DL HARQ timing, when there is no UL control channel assigned according to said first DL HARQ timing, wherein the determined second DL HARQ timing is used to determine which UL subframes in the TDD carrier that are defined for transmitting HARQ feedback on a physical UL shared channel for an associated set of DL subframes in the FDD carrier.

13. A non-transitory computer readable storage medium storing program code thereon for assignment of uplink (UL) channel resources by defining a first downlink (DL) Hybrid Automatic Repeat request (HARQ) timing for a Frequency-Division Duplexing (FDD) carrier and a second DL HARQ timing for the FDD carrier for enabling a second communication device to provide HARQ feedback on a physical UL shared channel in a communication system based on Time-Division Duplexing (TDD) and FDD carrier aggregation of at least one TDD carrier and at least one FDD carrier, wherein the program code comprises instructions for executing a method, comprising:

determining the first DL HARQ timing for the FDD carrier, wherein an association determines which UL subframes in the TDD carrier that are defined for transmitting HARQ feedback on an UL control channel for an associated set of DL subframes in the FDD carrier, determining the second DL HARQ timing for the FDD carrier, wherein an association determines which UL subframes in the FDD carrier that are defined for transmitting HARQ feedback on an UL shared channel for an associated set of DL subframes in the FDD carrier, whereby said determination results in a first set of UL subframes for which the physical UL shared channel is enabled to comprise HARQ feedback, and a second set of UL subframes for which the physical UL shared channel is not comprising HARQ feedback, and assigning UL channel resources for the HARQ feedback on the physical UL shared channel in said first set of UL subframes, according to said second DL HARQ timing, when there is no UL control channel assigned according to said first DL HARQ timing, wherein the determined second DL HARQ timing is used to determine which UL subframes in the TDD carrier that are defined for transmitting HARQ feedback on a physical UL shared channel for an associated set of DL subframes in the FDD carrier.

14. A communication device, for providing Hybrid Automatic Repeat request (HARQ) feedback on a physical uplink (UL) shared channel, in a communication system based on Time-Division Duplexing (TDD) and Frequency Division Duplexing (FDD) carrier aggregation of at least one TDD, carrier and at least one FDD carrier, according to an assignment made by a second communication device, the communication device comprising a processor and a non-transitory computer readable storage medium storing program code thereon that, when executed by the processor perform the steps comprising:
- transmitting HARQ feedback on the physical UL shared channel for downlink, DL, subframes which have been associated with a subframe according to a DL HARQ timing determined by the first communication device,
- wherein the DL HARQ timing is used to determine which UL subframes in the TDD carrier that are defined for transmitting HARQ feedback on a physical UL shared channel for an associated set of DL subframes in the FDD carrier.

15. The communication device according to claim 14, wherein the program code further comprises steps for:
- obtaining a first DL HARQ timing and a second DL HARQ timing, determined by the second communication device.

* * * * *